United States Patent
Song et al.

(10) Patent No.: US 11,413,688 B2
(45) Date of Patent: Aug. 16, 2022

(54) IMMISCIBLE-INTERFACE ASSISTED DIRECT METAL DRAWING

(71) Applicant: University of Iowa Research Foundation, Iowa City, IA (US)

(72) Inventors: Xuan Song, Iowa City, IA (US); Li He, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 378 days.

(21) Appl. No.: 16/539,310

(22) Filed: Aug. 13, 2019

(65) Prior Publication Data

US 2020/0047251 A1 Feb. 13, 2020

Related U.S. Application Data

(60) Provisional application No. 62/718,209, filed on Aug. 13, 2018.

(51) Int. Cl.
| | |
|---|---|
| *B33Y 70/00* | (2020.01) |
| *B33Y 10/00* | (2015.01) |
| *B22F 10/10* | (2021.01) |
| *B22F 12/00* | (2021.01) |
| *B33Y 30/00* | (2015.01) |
| *B33Y 80/00* | (2015.01) |

(52) U.S. Cl.
CPC .............. *B22F 12/00* (2021.01); *B22F 10/10* (2021.01); *B33Y 10/00* (2014.12); *B33Y 30/00* (2014.12); *B33Y 70/00* (2014.12); *B33Y 80/00* (2014.12)

(58) Field of Classification Search
CPC ........ B22F 12/00; B22F 10/10; B22F 3/1017; B22F 10/40; B22F 2998/10; B33Y 10/00; B33Y 30/00; B33Y 70/00; B33Y 80/00; B33Y 40/00; B33Y 40/20; Y02P 10/25
See application file for complete search history.

(56) References Cited

U.S. PATENT DOCUMENTS

| | | |
|---|---|---|
| 9,833,839 B2 | 12/2017 | Gibson et al. |
| 2017/0021419 A1 | 1/2017 | Ng et al. |
| 2017/0028618 A1 | 2/2017 | Robeson et al. |

FOREIGN PATENT DOCUMENTS

DE 102016219191 A1 4/2018

OTHER PUBLICATIONS

Li He Fan Fei, Wenbo Wang Xuan Song, Immiscible-Interface Assisted Direct Metal Drawing, Solid Freeform Fabrication 2018: Proceedings of the 29th Annual International Solid Freeform Fabrication Symposium—An Additive Manufacturing Conference (Year: 2018).*

Muth, J. T., Vogt, D. M., Truby, R. L., Mengüç, Y., Kolesky, D. B., Wood, R. J., and Lewis, J. A., 2014, "Embedded 3D printing of strain sensors within highly stretchable elastomers," Advanced Materials, 26(36), pp. 6307-6312 (Year: 2014).*

(Continued)

*Primary Examiner* — Rebecca Janssen
(74) *Attorney, Agent, or Firm* — Schwegman Lundberg & Woessner, P.A.

(57) ABSTRACT

A method of three-dimensional printing of target material can include filling a receptacle with a matrix suspension comprising a powder matrix suspended in a first liquid. A second suspension can be extruded into the matrix suspension, where the second suspension can include a target powder suspended in a second liquid.

11 Claims, 24 Drawing Sheets

(56) References Cited

OTHER PUBLICATIONS

"Zotero Report. UIowa-18133 SearchResults Jun. 22, 2018", [Online]. Retrieved from the Internet: <URL: zotero://report/library/items?itemKey=4PQAT24D,N37JBKZV,F8SZ6E . . . >, (Accessed Jun. 22, 2018), 6 pgs.
Muth, Joseph, et al., "Embedded 3D Printing of Strain Sensors within Highly Stretchable Elastomers", Adv. Mater., 26, (2014), 6307-6312.
Truby, R. L., et al., "Printing soft matter in three dimensions", Nature, 540(7633), (2016), 371-378.
Wu, Willie, et al., "Omnidirectional Printing of 3D Microvascular Networks", Adv. Mater., 23, (2011), H178-H183.

* cited by examiner

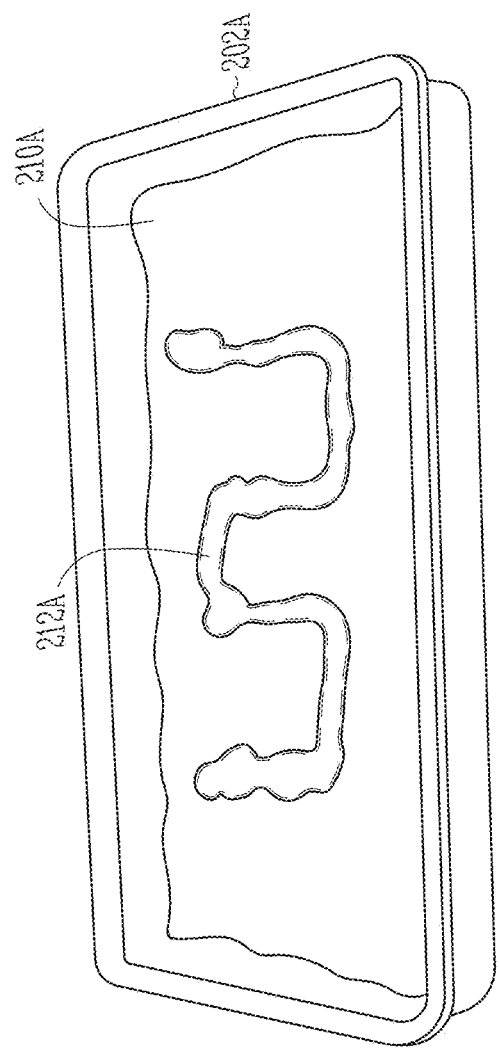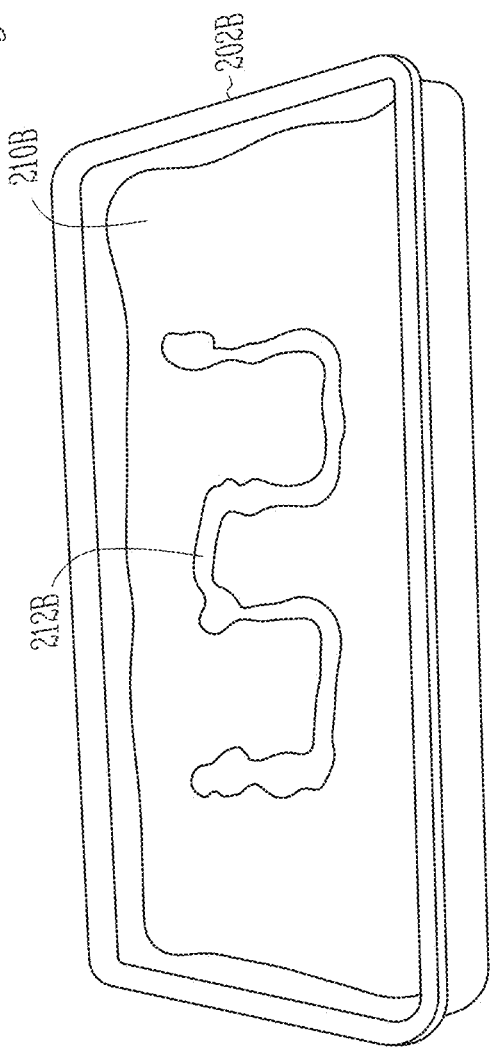

| DISTANCE BETWEEN FILAMENTS | | #1-2 | #2-3 | #3-4 | #4-5 | #5-6 |
|---|---|---|---|---|---|---|
| DESIGN | | 0.50 | 0.75 | 1.00 | 1.25 | 1.50 |
| AFTER DRYING | HORIZONTAL | 0.75 | 0.85 | 1.05 | 1.75 | 2.00 |
| | VERTICAL | 0.17 | 0.86 | 0.94 | 1.14 | 1.50 |

Fig. 15

PATH A

PATH A

PATH B

PATH B

MECHANICAL PROPERTIES OF BRONZE FILAMENTS ACHIEVED BY THE II-DMD PROCESS

| PROPERTIES | PRINTED BRONZE SPECIMEN | C90300 TIN BRONZE |
|---|---|---|
| YIELD STRENGTH | 110 ± 16 MPa | 145 MPa |
| ULTIMATE STRENGTH | 158 ± 30 MPa | 310 MPa |
| ELONGATION | 30 ± 10% | 30% |
| DENSITY | 8200 ± 200 Kg/m$^3$ | 8800 Kg/m$^3$ |

Fig. 18

IMMISCIBLE-INTERFACE ASSISTED DIRECT METAL DRAWING

CROSS-REFERENCE TO RELATED APPLICATION

This patent application claims the benefit of U.S. Provisional Patent Application No. 62/718,209, filed Aug. 13, 2018, which is incorporated by reference herein in its entirety.

BACKGROUND

This application relates generally, though not by way of limitation to three dimensional (3D) printing or additive manufacturing (AM). 3D printing or AM are processes whereby liquid, powder, or other base materials are used to form, often layer-by-layer, a three-dimensional structure using various machines often referred to as 3D printers or additive manufacturing assemblies. To print a 3D object using a 3D printer, a CAD (computer-aided design) file is often converted to printing information that is transferred to a 3D printer, which uses the printing information to create the 3D object. In some examples of 3D printing, metals can be used to print complex shapes, which may be more difficult and more expensive to print.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2A illustrates an additive manufacturing assembly, in accordance with at least one example of this disclosure.

FIG. 2B illustrates an additive manufacturing assembly including a suspension of a colloidal object suspended in a second colloid, in accordance with at least one example of this disclosure.

FIG. 15 illustrates a table data related to an additive manufacturing process, in accordance with at least one example of this disclosure.

FIG. 18 illustrates a table data related to an additive manufacturing process, in accordance with at least one example of this disclosure.

DETAILED DESCRIPTION

Figure 1:
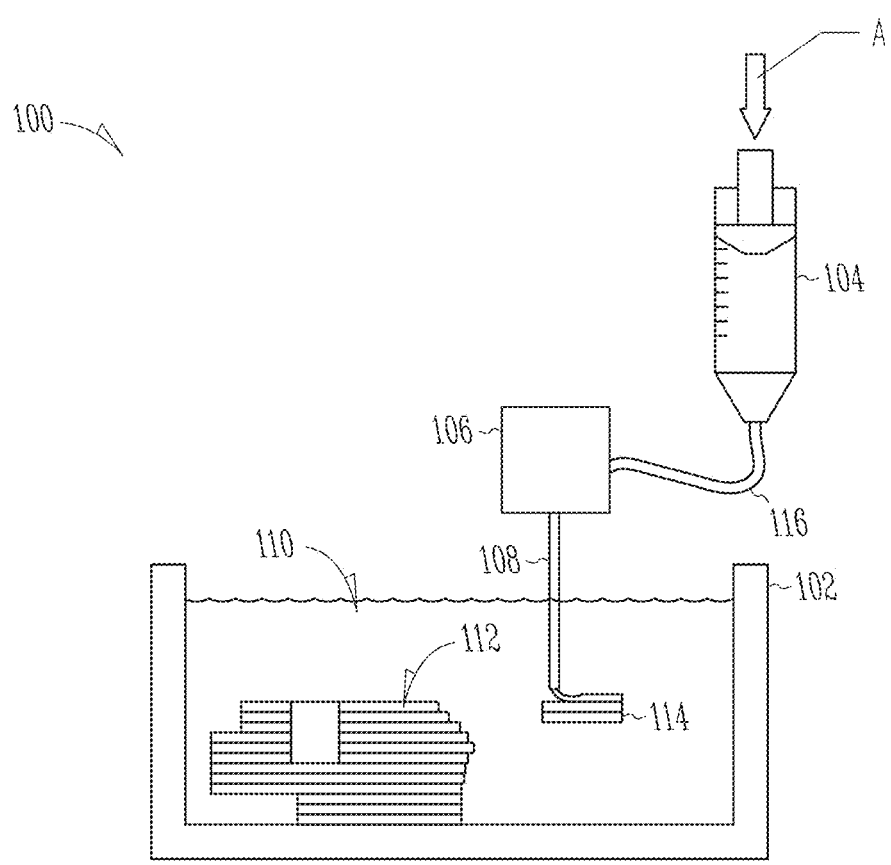
FIG. 1 illustrates a schematic view of an additive manufacturing assembly, in accordance with at least one example of this disclosure.

Some metal AM techniques construct a 3D structure through sintering or melting dry metal powders in a layer-by-layer fashion and localized high-temperature heating. The layer-based fabrication process and the localized high-temperature heating used in those processes result in several AM-specific issues in final structures, such as staircase effect, residual stress, and highly-orientated columnar microstructures. The staircase effect reduces surface finish of final components and can introduce stress concentration; residual stress and highly-orientated microstructures can negatively influence mechanical properties of final objects.

This disclosure addresses some of these problems, through the use of a layerless AM process for metal and alloy lattice fabrication, in which an immiscible interface and helpful rheological behaviors of highly-loaded metal and ceramic colloidal suspensions are utilized to build complex metal lattice structures. It can potentially fabricate numerous metal alloy materials without generating staircase effect and the need of support structures, and the microstructures of achieved metal alloy parts can potentially be homogeneous and isotropic. More specifically, an AM process can be used to fabricate a self-supported and isotropic 3D metal structure by continuously extruding a metal colloidal suspension within a second immiscible matrix colloidal suspension. The shape of the metal colloid can be stabilized due to the presence of an immiscible interface between the two colloidal systems. Dense metal structures can be achieved via post-consolidation of the self-stabilized metal-matrix colloidal systems, including liquid-phase drying and metal-phase sintering. Examples of structures that can be produced using these methods and devices are metal springs and metal lattice bridge-like structures. The immiscible-interface-assisted self-stabilization mechanism is discussed below with respect to specific examples. A post-consolidation processes is also discussed as are test cases.

In one example of this process, an alloy-powder-based suspension can be first deposited continuously in 3D space within a secondary matrix suspension and can then uniformly densified through heat treatment. By tailoring the two colloidal systems, a suitable immiscible interface can be established between the metal-powder suspension and the secondary matrix suspension, which consequently enables the self-stabilization of the deposited 3D geometry.

In some examples, an alumina-water matrix suspension with a solid loading from 35 weight percentage to 40 weight percentage, and a bronze-oil suspension with a solid loading of about 94 weight percentage can produce a desired self-stabilization of the material system after extrusion.

The discussion above is intended to provide an overview of subject matter of the present patent application. It is not intended to provide an exclusive or exhaustive explanation of the invention. The discussion below is included to provide further information about the present patent application.

FIG. 1 illustrates a schematic view of an additive manufacturing (AM) assembly 100, in accordance with at least one example of this disclosure. AM assembly 100 can include a receptacle 102, a supply container 104, a control device 106, an injector 108, a matrix suspension 110, a metal suspension 112, an extrusion 114, and a supply line 116. Also shown in FIG. 1 is a direction A.

The receptacle 102 can be a container or receptacle sized and shaped to retain the matrix suspension 110 and the metal suspension 112 before, during, and after extrusion. In some examples, the receptacle 102 can be configured to resist high temperatures so that the receptacle 102 can retain the matrix suspension 110 and the metal suspension 112 during evaporating and sintering, as discussed below. In some examples, the receptacle 102 can be comprised of materials with relatively high melting temperatures, such as plastics, metals, ceramics, foams, combinations thereof, or the like.

The supply container 104 can be a container or receptacle configured to receive the metal suspension 112 (in a direction A) and can be connected to the supply line 116 to deliver the metal suspension to the control device 106. The control device 116 can be, for example, an electromechanical controllable device that can include one or more actuators and controllers. The controller within or connected to the control device 106 can be a programmable controller, such as a single or multi-board computer, a direct digital controller (DDC), or a programmable logic controller (PLC). In other examples the controller can be any computing device, such as a handheld computer, for example, a smart phone, a tablet, a laptop, a desktop computer, or any other computing device including a processor and wireless communication capabilities. The one or more actuators within the control device can include electric motors, for example, to control movement of the injector 108 with respect to the receptacle 102. The control device 106 can further include a fluid control mechanism therein, such as a control valve, for selectively controlling flow rate and pressure of the metal suspension 112 through the control device. These and other components of the control device can be used to accurately inject the metal suspension 112 into the matrix suspension 110 through the injector 108.

The injector 108 can be connected to the control device 106 and can be a nozzle, needle, or other injection device configured to inject a fluid, such as the metal suspension 112 in a desired pattern or shape. As shown in FIG. 1, the injector 108 can be used to create the extrusion 114 within the matrix suspension 110.

The matrix suspension 110 can be a powder material or powder matrix suspended in a first liquid. For example, the matrix suspension 110 can be a secondary matrix colloidal-suspension which can be a mixture of water and support powders with a higher melting temperature than the metal powders, such as ceramic powders (Aluminum Oxide, Zirconium Oxide, or the like). In other examples, other liquids and powders can be used. The metal suspension 112 can be a metal-based colloidal-suspension, which can be a mixture of silicon oil and metal powders of interest. For example, the metal powder can be aluminum, bronze, steel, combinations thereof, or the like. Similarly, other liquids can be used so long as they are immiscible with the first liquid.

In some examples of an additive manufacturing process, i.e. immiscible-interface assisted direct metal drawing (II-DMD), a 3D object can be fabricated by continuously extruding a metal colloidal suspension 112 within a second immiscible matrix colloidal-suspension 110. Here, the suspension of ceramic particles in water 110 can form a support or matrix inside the receptacle 102 that can hold the ceramic slurry support 110. The movable needle 108 can extend into the matrix 110 to inject (or print) metal particles suspended in oil (metal suspension 112) into the support 110. During this process, the control device 106 can control movement of the needle 108, an injection flow rate of the extrusion 114 from the needle 108, and an injection pressure/velocity of the extrusion 114 from the needle 108. In some examples, the control device 106 can be operated based on preloaded instructions, for example, code derived from CAD files. In other examples, control device 106 can be connected (via wire or wirelessly) to another device, which can control operation of the control device 106 and the needle 108.

The oil carrier that can be used for the metal suspension 112 can be immiscible in the ceramic/water suspension 110, such that the metal/oil suspension 112 will maintain shape upon introduction into the ceramic/water suspension 110. Upon completion of printing, the receptacle 102 can hold the ceramic/water slurry suspension 110 in which the metal/oil suspension 112 has been printed (or extruded) in a desired shape. The ceramic/water slurry 110 can maintain the shape of the metal/oil suspension 112 by helping to prevent the metal/oil from sinking, diffusing, or otherwise separating. Further details of the process are discussed below with respect to FIGS. 2-4.

Figure 2C:
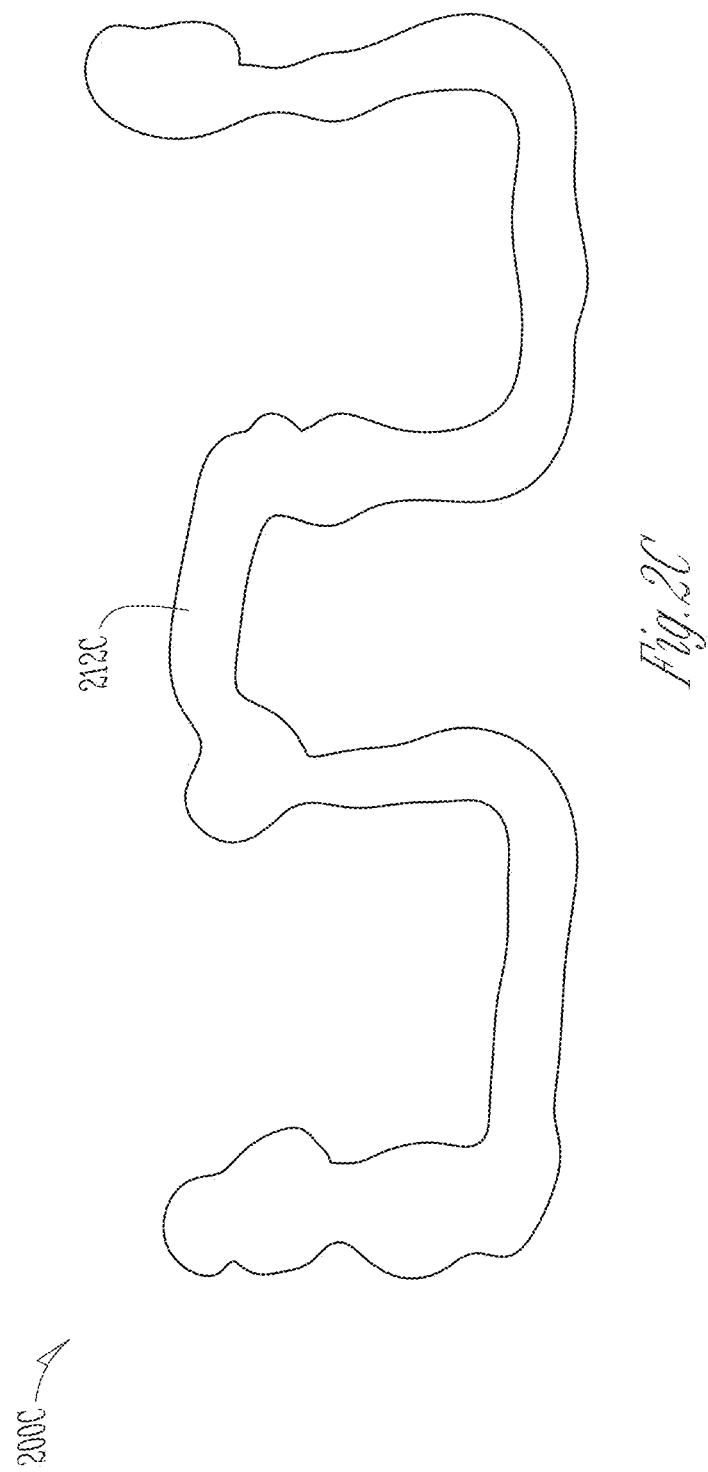
FIG. 2C illustrates an additive manufacturing assembly including a sintered metal object removed from a second matrix powder bed, in accordance with at least one example of this disclosure.

FIG. 2A illustrates an additive manufacturing assembly 200A, in accordance with at least one example of this disclosure. FIG. 2B illustrates an additive manufacturing assembly 200B including a suspension of a colloidal object suspended in a second colloid, in accordance with at least one example of this disclosure. FIG. 2C illustrates an additive manufacturing assembly 200C including a sintered metal object removed from second matrix powders, in accordance with at least one example of this disclosure. FIGS. 2A-2C are discussed below concurrently.

AM assemblies 200 can each include a receptacle 202, a matrix suspension 210, and a metal suspension 212. Each component of the AM assembly is indicated by A, B, or C for reference its respective drawing. The components of AM assemblies 200 can be consistent with the AM assembly 100 discussed above, except that FIGS. 2A-2C shown the AM assembly 200 in various conditions not shown in FIG. 1.

In FIG. 2A, a two-dimensional curve 212A can be drawn on the surface of the matrix colloidal suspension 210A to provide a visual representation of the material to be deposited. In some examples, this step can be performed using CAD software. A file created from the CAD model can then be transformed into instructions and delivered to the control unit, such as control unit 106 of FIG. 1, to create the metal suspension 212B in the shape of the drawn suspension 212A, as shown in FIG. 2B.

The shape of the metal colloid 212B can be stabilized within the matrix colloidal suspension 210B after extrusion without any macroscopic distortion or defects, due to the presence of an immiscible interface between the two colloidal systems, as shown in the example of FIG. 2B. In some examples, without loss of generality, the same procedure can be utilized to achieve various 3D shapes of more complexity within the matrix colloidal-suspension.

Following completion of extraction and formation of the desired shape of the metal suspension 212B within the matrix suspension 210B, further steps can be taken to create a finished product. For example, to obtain a solid and dense metal structure from the deposited compound suspension, two post-consolidation steps can be conducted sequentially: pre-sintering evaporation and sintering. In pre-sintering evaporation, the metal can be solidified in a desired shape by heating the structure (receptacle, ceramic/water, and metal/oil) to a temperature high enough to evaporate the water and oil but not high enough to sinter or melt the metal or the ceramic. In one example of a pre-sintering evaporation step, the deposited slurry materials can be heated in an oven at about 70 degrees Celsius for about one hour. Through this step, both the metal colloid 212B and the matrix colloid 210B can become dry powders, with pure metal particles stacked in a powder bed of matrix particles (e.g. aluminum oxide) in the desired shape.

The receptacle 200B can hold the ceramic powder matrix 210B and the matrix 210B can hold the metal powder 212B in the desired shape. The dried structure can then be heated to a temperature high enough to sinter the metal but not high enough to melt the ceramic. In one example of the sintering step, the dried powders can be sintered in inert gas under a temperature of 950 degrees Celsius for about three hours. Through this step, the metal powders can be densified into a solid, and the matrix powders can remain substantially porous due to its high melting temperature. This can allow the solid metal portion 212B to be easily separated from the porous matrix powders 210B. The result of this sintering step is a sintered solid metal product inside the matrix of ceramic powder, all of which can remain in the receptacle. After the sintering steps, a dense metal object can be obtained. Finally, the sintered and solidified metal product 212C can be removed from the matrix 210. In some examples, the ceramic or support matrix 210B can be reused after the solid metal product 212C is removed.

Though the matrix and build materials are discussed above as being ceramic and metal, respectively, the matrix and build materials can be other substances. However, the materials selected for the matrix material and the build material may still have melting temperatures that differ enough to permit the two-step evaporation and sintering process.

Figure 3A:
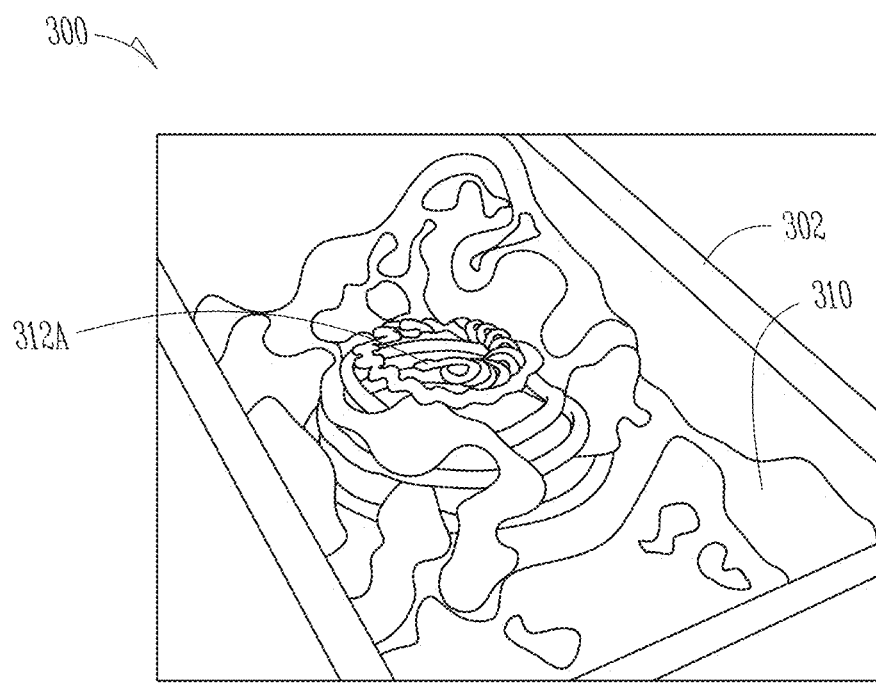
FIG. 3A illustrates an additive manufacturing assembly including a sintered metal object suspended in a second matrix powder bed, in accordance with at least one example of this disclosure.
Figure 3B:
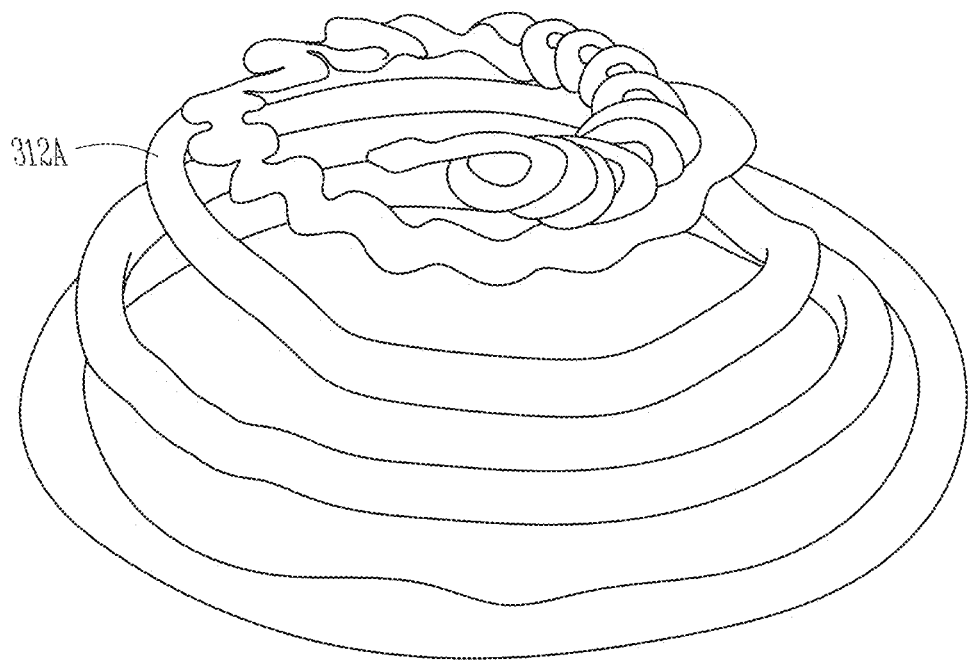
FIG. 3B illustrates an additive manufacturing assembly including a colloidal object removed from a second colloid, in accordance with at least one example of this disclosure.
Figure 3C:
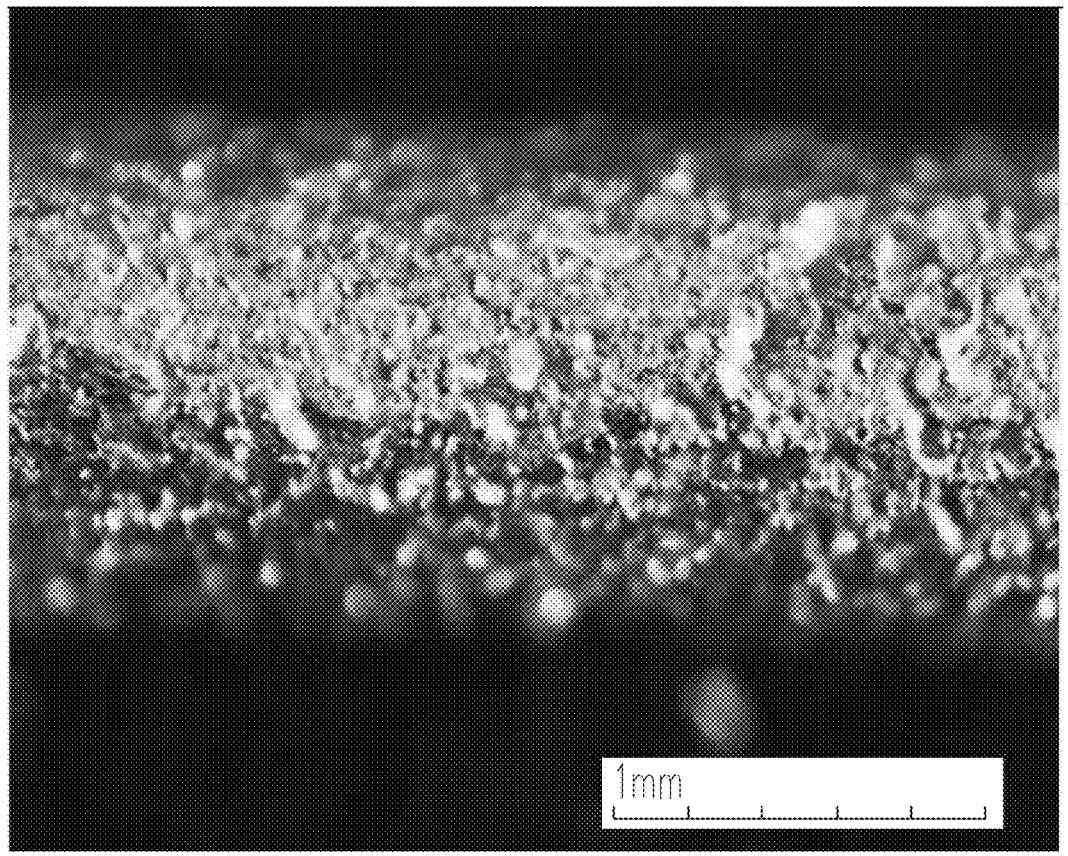
FIG. 3C illustrates an optical microscope imaging result of additive manufacturing product in a first condition, in accordance with at least one example of this disclosure.
Figure 3D:
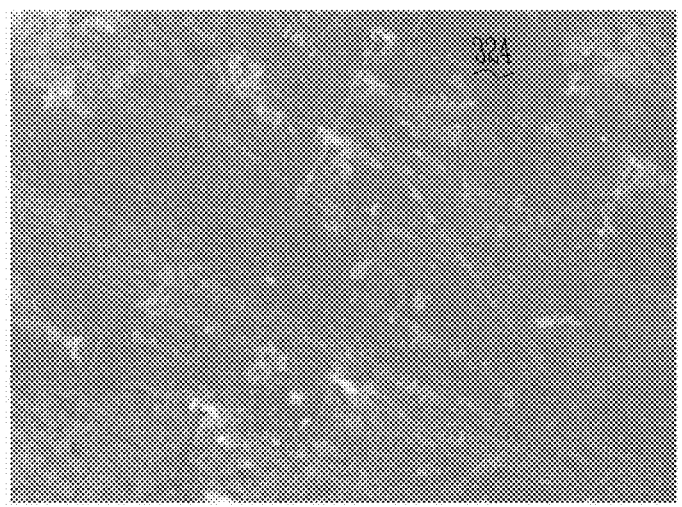
FIG. 3D illustrates a scanning electron microscope imaging result of additive manufacturing product in a second condition, in accordance with at least one example of this disclosure.

FIG. 3A illustrates an additive manufacturing assembly 300 including a sintered metal object suspended 312 in a second matrix powder bed 310, in accordance with at least one example of this disclosure. FIG. 3B illustrates an additive manufacturing assembly 300 including a sintered metal object 312 removed from a second matrix powder bed 310, in accordance with at least one example of this disclosure. FIG. 3C illustrates an optical microscope imaging result of the additive manufacturing product 312C in a first condition, in accordance with at least one example of this disclosure. FIG. 3D illustrates a scanning electron microscope imaging result of the additive manufacturing product 312D in a second condition, in accordance with at least one example of this disclosure. FIGS. 3A-3D are discussed below concurrently.

In some examples, a 3D bronze spring 312 can be fabricated using the methods discussed above with respect to FIGS. 1-2C. For example, the bronze spring 312 can be extruded into and suspended by the ceramic slurry 310 within a receptacle 302. FIG. 3C shows an optical microscope imaging result of the bronze spring 312C following evaporation and sintering.

A sintering process (such as heating of the ceramic slurry 310 and the bronze spring 312) can be performed following evaporation. The results of such a process are shown with respect to FIG. 3D, which illustrates a scanning electron microscope imaging result of the bronze spring having a uniform cross-section 324. The results suggest a relatively high density of the achieved material. As shown in FIG. 3B, the bronze spring can be removed from the second matrix powder 310 after sintering.

The methods discussed herein can also be used to fabricate complex 3D metal objects. In some examples, these methods can be used to create lattice structures, such as a vascular stent. Compared to existing metal 3D printing methods, the example II-DMD processes discussed herein can achieve isotropic properties in the final metal structures and may have no restriction with the materials that can be fabricated. Moreover, the proposed process may be more cost-effective.

Figure 4:
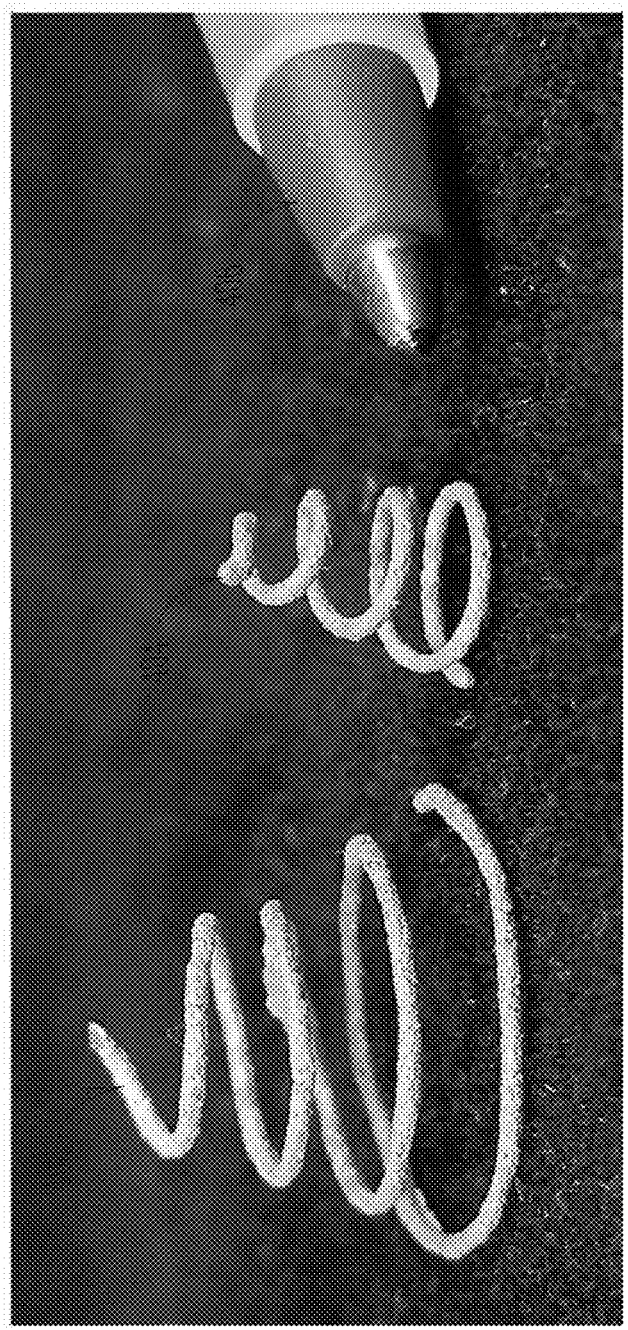
FIG. 4 illustrates fabrication results of two springs, in accordance with at least one example of this disclosure.

FIG. 4 illustrates fabrication results of two example springs, in accordance with at least one example of this disclosure. FIG. 4 shows a first spring 402 and a second spring 404 positioned next to a typical ball-point pen 406 for reference.

The first spring 402 and the second spring 404 can be fabricated using the methods and devices discussed above with respect to FIGS. 1-3D and below with respect to FIG. 5. As shown in FIG. 4, these methods and devices can be used to create the relatively small and intricate components.

Figure 5:
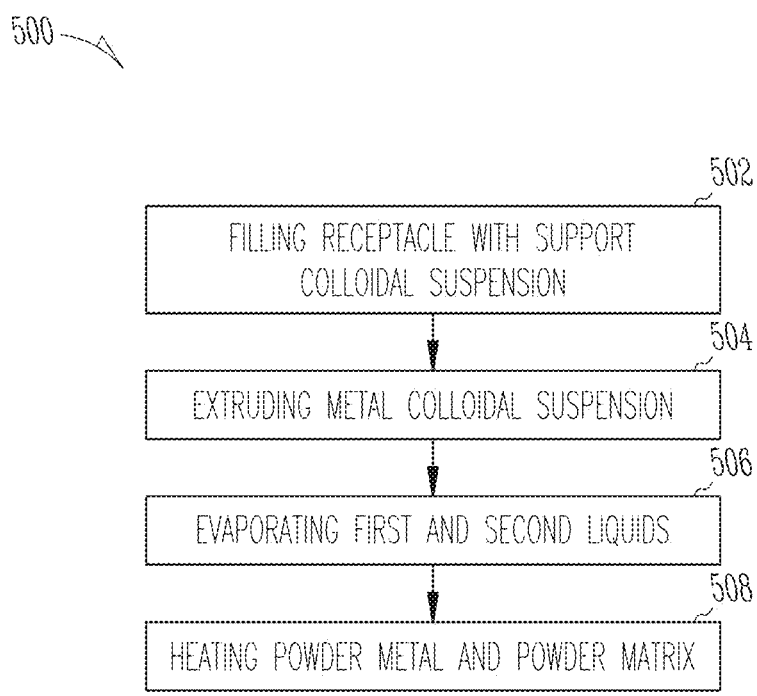
FIG. 5 illustrates a schematic view of a method of additive manufacturing, in accordance with at least one example of this disclosure.

FIG. 5 illustrates method 500 of additive manufacturing, in accordance with at least one example of this disclosure. Method 500 can be a method of additive manufacturing, in one example. The steps or operations of method 500 are illustrated in a particular order for convenience and clarity; many of the discussed operations can be performed in a different sequence or in parallel without materially impacting other operations. Method 500 as discussed includes operations that may be performed by multiple different actors, devices, and/or systems. Subsets of the operations discussed in method 500 attributable to a single actor, device, or system could be considered a separate standalone process or method.

In an example method of creating a metal object using additive manufacturing, the method can begin at step 502, which can include filling a receptacle with a support or matrix colloidal suspension including a powder material or powder matrix suspended in a first liquid. For example, receptacle 102 can be filled with the matrix colloid 110. At step 504, a metal colloidal suspension can be extruded into the matrix suspension, where the metal colloidal suspension can include a metal powder suspended in a second liquid. For example, the metal suspension 112 can be extruded into the matrix suspension 110, where the metal suspension 112 can include a metal powder suspended in a liquid.

At step 506, the first and second liquids can be evaporated by heating the metal colloidal suspension and the matrix suspension to a first temperature below a sinter temperature and a melt temperature of the powder metal and below a sinter temperature and a melt temperature of the powder matrix. For example, the liquid of the matrix suspension 110 and the liquid of the metal colloid suspension 112 can be evaporated by heating the metal suspension 110 and the matrix suspension 112 to a first temperature below a sinter temperature and a melt temperature of the powder metal and below a sinter temperature and a melt temperature of the powder matrix, such as 70 degrees Celsius. However, other temperatures can be used, such as 45, 50, 55, 60, 65, 75, 80, 85, 90, 95, and 100 degrees Celsius, and the like.

At step 508, the powder metal and powder matrix can be heated to a second temperature at or above the sinter temperature of the powder metal to sinter the powder metal, the second temperature below the sinter temperature and the melt temperature of the powder matrix, to form a sintered metal product. For example, the powder metal of metal suspension 112 and the powder matrix of matrix suspension 110 can be heated to a second temperature at or above the sinter temperature of the powder metal to sinter the powder metal, where the second temperature is below the sinter temperature and the melt temperature of the powder matrix, to form a sintered metal product, such as object 212B or bronze spring 312D.

In some examples, the powder matrix of the matrix suspension 110 can be a ceramic and the first liquid of the matrix suspension 110 can be water. In some examples, the powder metal of the metal suspension 112 can be bronze and the second liquid of the metal suspension 112 can be silicon oil. However, as discussed above, other ceramics, metals, and liquids can be used (e.g., molten wax), as desired.

In some other examples, the first temperature can be about seventy degrees Celsius for about one hour and/or the second temperature can be about 950 degrees Celsius for about three hours.

In some examples, the powder metal and the powder matrix can be heated by inert gas. In some examples, the sintered metal product can include at least one isotropic property.

In an example method of three-dimensional printing of metal comprising, the method can include filling a receptacle with a matrix suspension comprising a powder matrix suspended in a first liquid. For example, receptacle 102 can be filled with the matrix colloid 110. A metal suspension can be extruded into the matrix suspension, where the metal suspension can include a powder metal suspended in a second liquid. For example, the metal suspension 112 can be extruded into the matrix suspension 110, where the metal suspension 112 can include a metal powder suspended in a liquid. The first and second liquids can be evaporated by heating to a temperature high enough to facilitate evaporation of the first and second liquids but not high enough to sinter or melt the powder metal or powder matrix. For example, the liquid of the matrix suspension 110 and the liquid of the metal colloid suspension 112 can be evaporated by heating the metal suspension 110 and the matrix suspension 112. The powder metal and powder matrix can be heated to a temperature high enough to sinter the powder metal but not high enough to sinter or melt the powder matrix to form a sintered metal product. For example, the powder metal of the metal suspension 112 and the powder matrix of matrix suspension 110 can be heated to a temperature high enough to sinter the powder metal of the metal suspension 112 but not high enough to sinter or melt the powder matrix of the matrix suspension 112 to form a sintered metal product, such as object 212B or bronze spring 312D.

In some examples, the sintered metal product can be removed from the powder matrix. In some examples, the melting temperature of the powder metal can be higher than the melting temperature of the powder matrix. In various examples, the metal suspension can be immiscible with the matrix suspension.

In some examples, the matrix suspension can maintain the metal suspension substantially in place during extruding of the metal. In various examples, the metal suspension can be extruded into the matrix suspension by injecting the metal suspension into the matrix suspension. In some examples, the metal suspension can be extruded into the matrix suspension using a movable nozzle or a movable needle.

In another example of method 500, a metal-powder suspension can be dispensed within a ceramic suspension through a nozzle. The shape of the metal-powder suspension can be controlled by moving the nozzle along a pre-defined tool path. The metal-powder suspension can remain stable within the ceramic suspension due to a tailored surface tension between them. The materials can then be dried in an oven, yielding a metal-powder compact in a desired shape surrounded by ceramic powders. In the final stage, the metal-powder compact together with the ceramic powders is heated in a high-temperature furnace, where the metal powders are densified into a solid and the ceramic powders are still substantially porous due to its high melting temperature. After removing the loose ceramic powders, a 3D metal part can be obtained.

Figure 6:
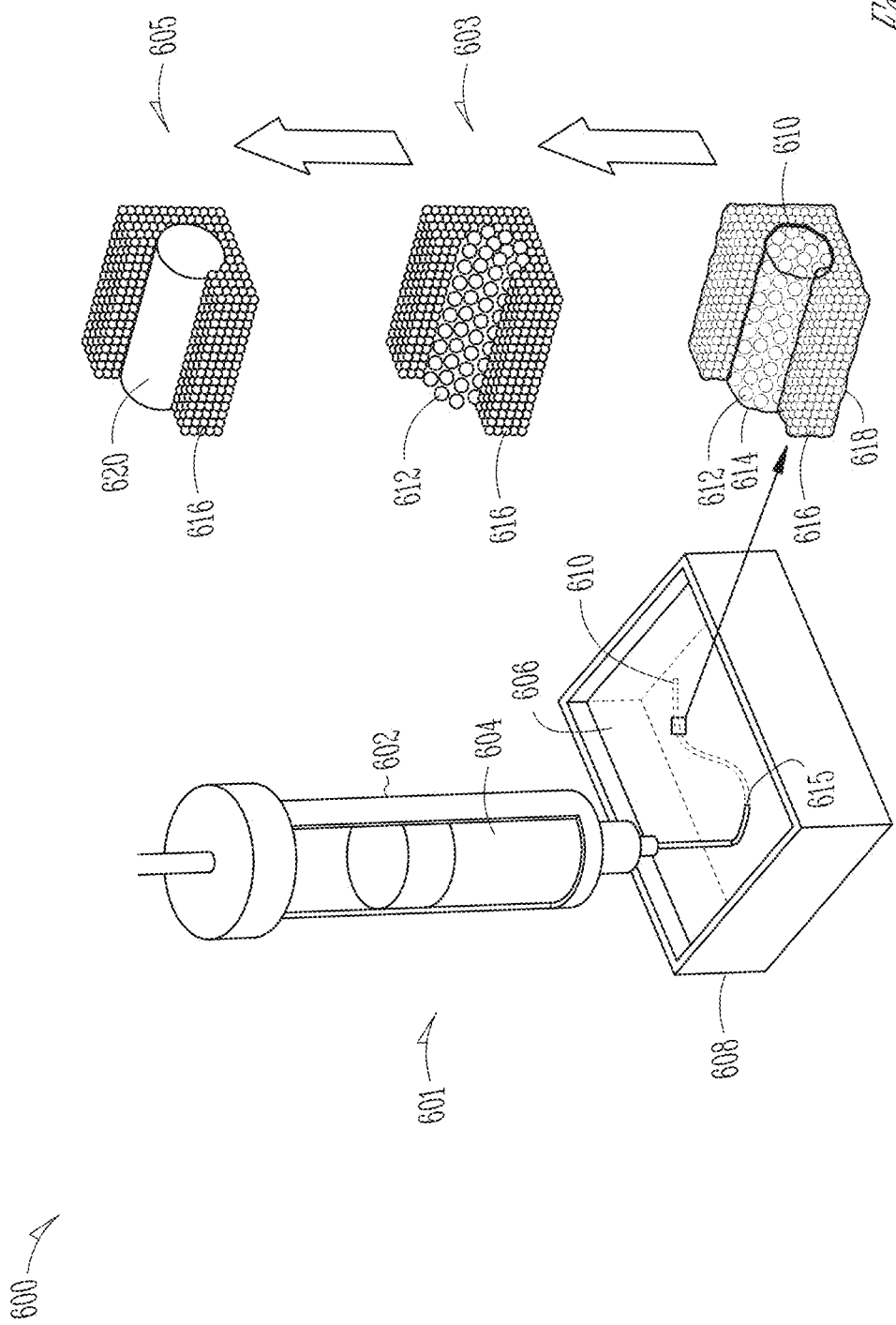
FIG. 6 illustrates a schematic view of an additive manufacturing assembly and process, in accordance with at least one example of this disclosure.

FIG. 6 illustrates a schematic view of an additive manufacturing assembly 600 and process, in accordance with at least one example of this disclosure. A first step 601 shows that the assembly 600 can include a syringe 602, a bronze slurry 604, an alumina-water slurry 606, and a container 608. The first step 601 can produce a printed part 610. FIG. 6 also shows a focused view of the printed part 610 including a bronze portion 612, a silicon oil 614, an alumina portion 616, and a water portion 618. FIG. 6 further shows a second step 603 of drying, which shows that the printed part 610 can include only the alumina portion 616 and the bronze portion 612. FIG. 6 further shows a third step 605 of sintering where the bronze portion 612 is solidified.

More specifically, bronze can be used to create a layerless AM of a 3D metal alloy lattice components via an immiscible-interface assisted direct metal drawing (II-DMD). The aluminum oxide or alumina 616 can be used as a secondary matrix material, which can act as a support medium to maintain a 3D geometry of the body material (e.g., bronze powders) throughout heat treatment. Alumina can be used because of its high sintering temperature in comparison to bronze powders. This temperature difference allows the secondary matrix material to remain loose after heat treatment and to be ultimately removed from target alloy components.

In one example of a II-DMD process, both a bronze powder and an alumina powder are prepared to create suspensions. Silicon oil can be used as the dispersion medium of the bronze-powder suspension 604 and water can be used as the dispersion medium of the alumina-matrix suspension 606 to introduce an immiscible interface between bronze particles 612 and the alumina particles 616. This enables self-stabilization of the deposited bronze-powder suspension 604 in an alumina-matrix suspension 606.

Bronze-oil suspensions can be prepared by mixing as-received bronze powders with silicon oil at a specific concentration in a magnetic stirrer for about 15 minutes. The composition and properties of the bronze powders can be, in one example, as follows, 90% copper, 10% tin, and 0.07% phosphorous with an apparent density of about 5 grams per cubic centimeter, and a particle size of about 325 MESH or smaller. Alumina-water suspensions can be prepared, in one example, by mixing alumina powders (such as (D50: 9 μm, GE6) with deionized water at a specific concentration in a magnetic stirrer for approximately 15 minutes.

The syringe 602 can be a pressurized dispensing syringe that is mounted on a three-degree-of-freedom (DoF) gantry. The syringe 602 can be loaded with the bronze-oil suspension (slurry) 604 and can be controlled to continuously extrude the suspension 604 along a given 3D tool path 615 within the alumina-water suspension 606 in the container 608. The tool path 615 of the syringe can be created with a customized program, such as a code created using mathematical modeling software, such as Matlab. As the bronze-oil suspension 604 is deposited, an immiscible water-oil interface is instantaneously established between the bronze particles 612 and the alumina particles 616, which can lock the bronze particles 612 and the alumina particles 616 in position with respect to each other and can help to maintain the 3D shape of the deposited bronze-oil suspension 604. Further, rheological properties of both bronze suspension 604 and the alumina suspensions 606 can be tailored to avoid deformation of the deposited 3D shape during fabrication (e.g., fragments, bead up, diffusion, or sedimentation).

After the bronze-oil suspension 604 is deposited, the container 608 can be heated in an oven to evaporate the liquid components in the drying step 603. The water 608 of the alumina-water suspension 606 and the silicon oil 604 of the bronze-oil suspension 604 can be evaporated, leaving only dry bronze particles 612 in a desired 3D shape embedded in the alumina particles 616, which can form a dry alumina powder bed.

Following the drying step 603, a sintering step 605 can be performed. A high-temperature sintering process of the step 615 can densify the bronze particles 612 to form a dense bronze component 620 while the surrounding alumina particles 616 can remain loose. The temperature schedules for both drying and sintering are discussed below with respect to FIGS. 10A and 10B. After removing the loose alumina particles 616, the dense bronze component 620 can be obtained. Both the removed alumina powder 616 and the leftover bronze suspension 604 in the syringe can be recycled and reused, as discussed below in FIG. 7.

Figure 7:
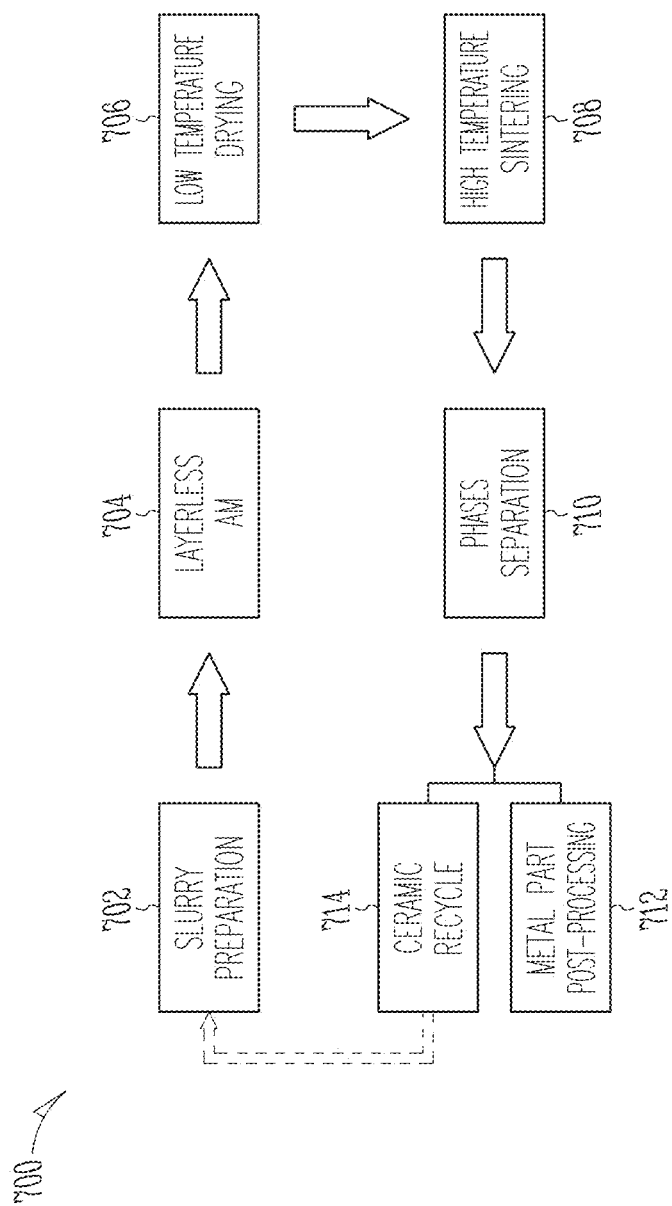
FIG. 7 illustrates a schematic view of an additive manufacturing process, in accordance with at least one example of this disclosure.

FIG. 7 illustrates a schematic view of an additive manufacturing process 700, in accordance with at least one example of this disclosure. The process 700 can be a method of additive manufacturing similar to the process discussed above with respect to FIG. 6. The process 700 can begin at step 702 where the slurries, such as the bronze suspension 604 and the alumina-water suspension 606 can be prepared. Then, at step 704 layerless additive manufacturing of the bronze suspension can be performed using a controlled continuously extrusion process. At step 706, a low temperature drying can be performed on the slurry mixtures to evaporate water from the alumina-water suspension 606 and to evaporate oil from the bronze suspension 604. Then, at step 708, high temperature sintering of the bronze can be performed to create a dense bronze product. At step 710, the product can be separated from the alumina particulate. At steps 712 and 714 the bronze slurry 604 and the aluminum particulate 616 can be processed for recycling so that the products can be used to manufacture another product. Such II-DMD processes as those discussed above can offer several advantages in building metal lattice structures, such as isotropic mechanical properties, low residual stress, faster manufacturing speed, and a benefit of no required support structures for the 3D product.

Figure 8A:
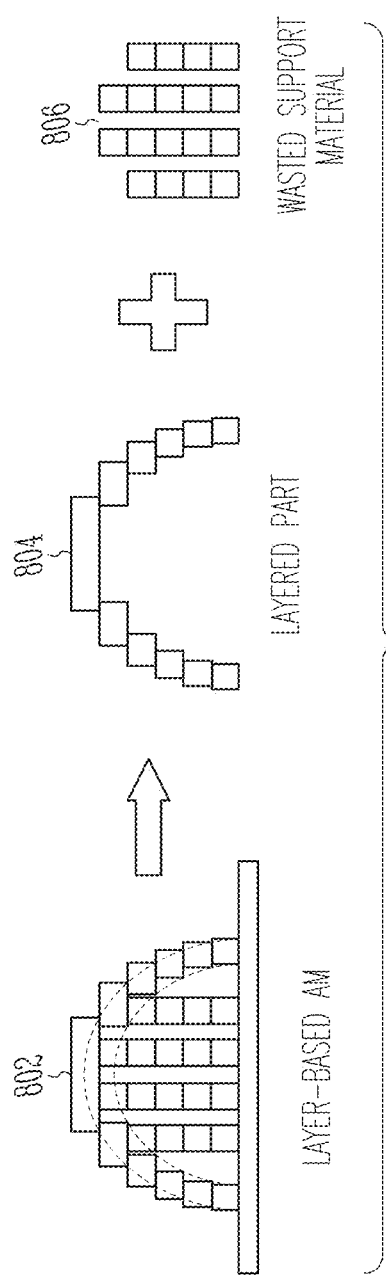
FIGS. 8A and 8B illustrate schematic views of additive manufacturing processes, in accordance with at least one example of this disclosure.
Figure 8B:
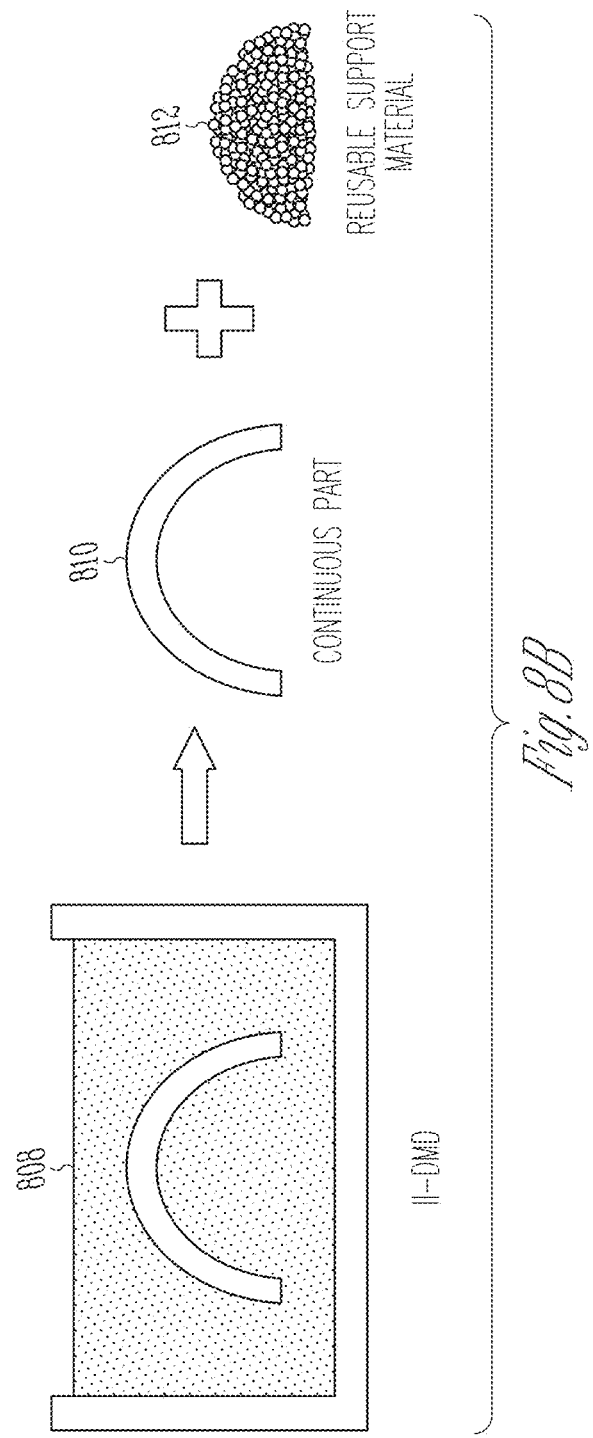

FIGS. 8A and 8B illustrate schematic views of an additive manufacturing process 800, in accordance with at least one example of this disclosure. FIG. 8A shows how a 3D metal alloy lattice component 802 fabricated by layer-based AM can include a layered part 804 having a surface staircase effect. Such parts can also exhibit anisotropic mechanical properties due to columnar microstructures caused by directional heat flow. Some complex lattices can require overhanging features. A sacrificial support structure 806 can be required to prevent distortion and/or curling of the component 802 caused by thermal stresses. These drawbacks can be overcome in the proposed II-DMD process by continuously extruding materials in 3D space instead of in a layer-by-layer manner. For example, a 3D assembly 808, shown in FIG. 8B can be used in the II-DMD processes discussed above with respect to FIGS. The assembly 808 can produce a continuous part 810 not having a surface staircase effect. Further, a supportive slurry, when dried, can produce support material 812 (such as alumina particles) that can be reused.

Figure 9B:
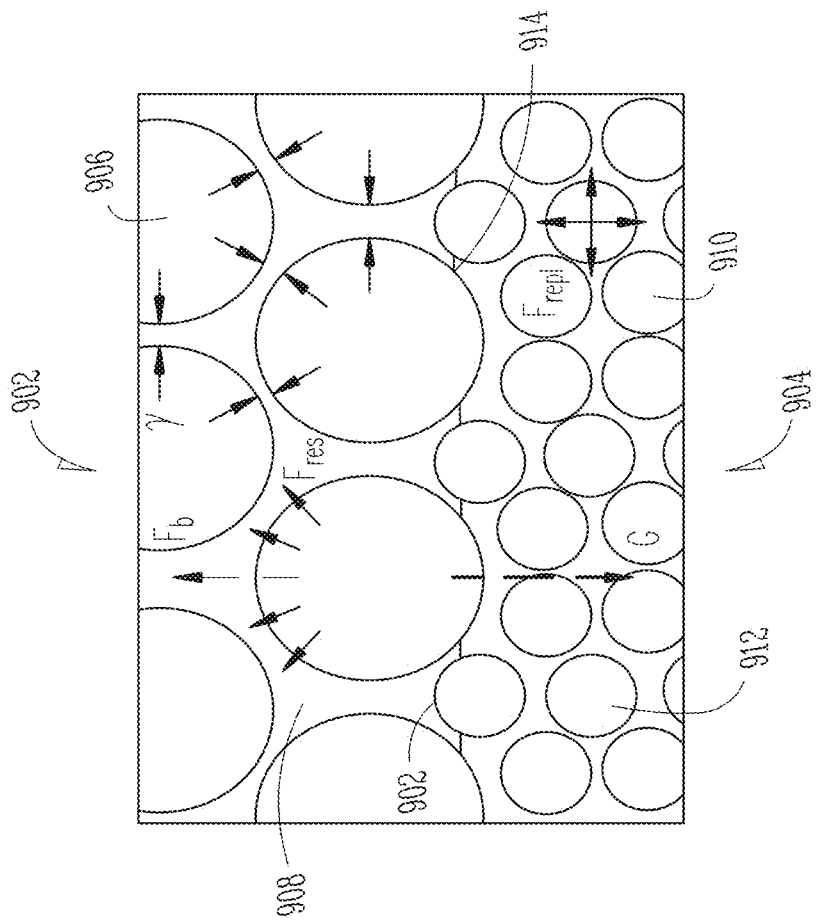
FIG. 9B illustrates materials of an additive manufacturing process, in accordance with at least one example of this disclosure.
Figure 9A:
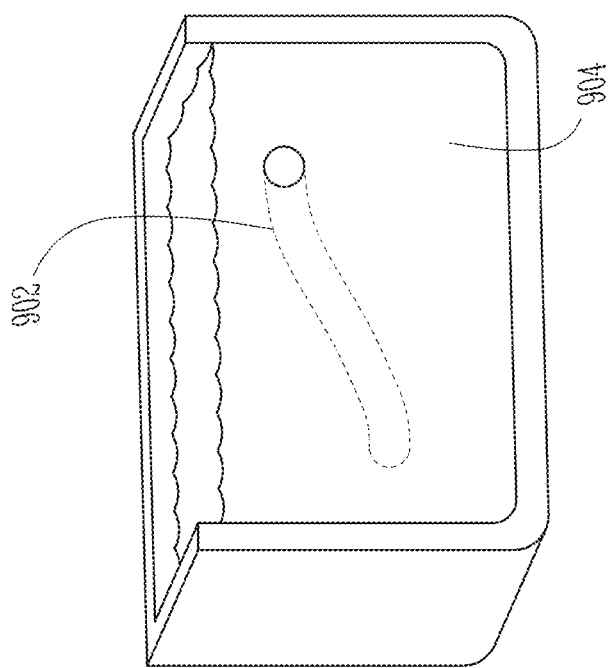
FIG. 9A illustrates an additive manufacturing assembly, in accordance with at least one example of this disclosure.

FIG. 9A illustrates an additive manufacturing assembly 900, in accordance with at least one example of this disclosure. FIG. 9B illustrates materials of an additive manufacturing process, in accordance with at least one example of this disclosure. FIGS. 9A and 9B are discussed below concurrently.

As shown in FIG. 9A, the additive manufacturing assembly 900 can include a metal-oil slurry or suspension 902 (such as a bronze slurry) and a support slurry 904 (such as a water-alumina slurry). FIG. 9B shows a focused view of a portion of the metal-oil slurry 902 and the support slurry 904, where the metal-oil slurry 902 can include metal particles 906 and oil 908. The support slurry 904 can include support particles 910 and a support fluid (such as water) 912. Also shown in FIG. 9B are a surface tension γ, a buoyant force $F_b$, a repulsive force $F_{res}$, and a gravitational force G.

In such a configuration shown in FIGS. 9A and 9B, and in the processes discussed above with respect to FIGS. 1-7, the oil 908 and the water 910 can form an immiscible interface 914 between the two suspensions 902 and 904. The immiscible interface 914 between the oil 908 and the water 910 can act as a barrier to help keep separate the bronze particles 906 and the alumina particles 910, as shown in FIG. 9B.

In the metal-oil suspension 902, the oil 908 can be pre-infused within highly-loaded metal particles 906, yielding a large surface tension γ between the bronze particles 906. The surface tension γ and the buoyant force $F_b$ from the liquid oil 908 can create the resistance force $F_{res}$ applied to each bronze particle 906 where the resistance force $F_{res}$ can overcome the gravitational force G and consequently can maintain relative distances between the bronze particles 906. Meanwhile, due to the presence of the surface tension γ between the bronze particles 906 and the immiscible oil-water interface 914, the alumina particles 910 cannot break through the immiscible interface boundary 914 and therefore cannot diffuse into the bronze phase 904 unless additional forces, such as a stirring force, is applied. On the other hand, in the alumina-water suspension 904, the alumina particles 910 can be relatively uniformly distributed under the repulsive force $F_{repl}$ resulting from particle surface charges. When solid loading of the alumina particles 910 is sufficiently high, the repulsive force $F_{repl}$ can reliably support an extruded structure of bronze-oil suspensions without distortion and deformation.

Figure 10A:
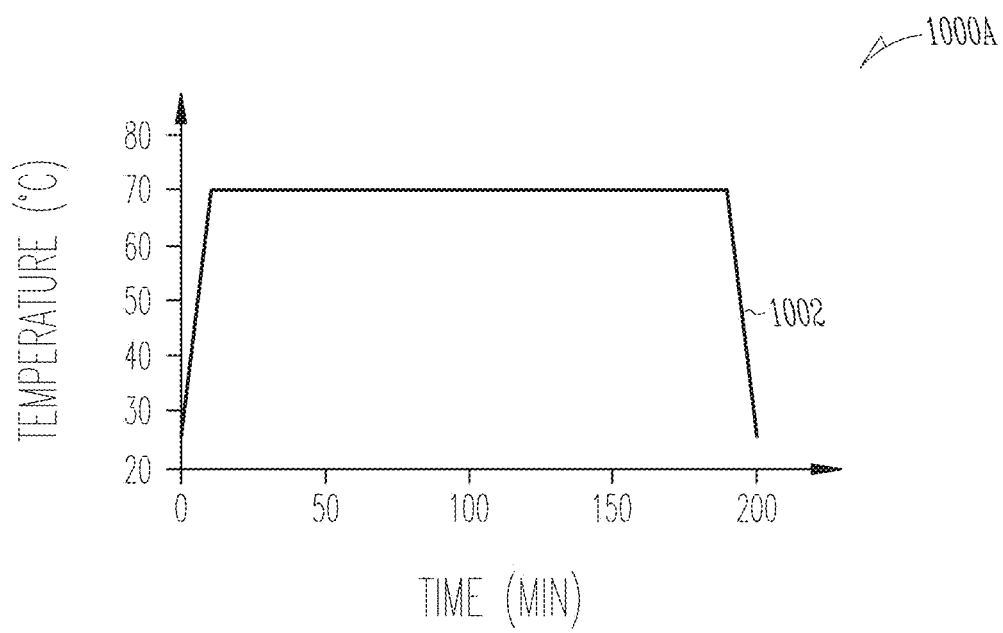
FIG. 10A illustrates a graph associated with an additive manufacturing process, in accordance with at least one example of this disclosure.
Figure 10B:
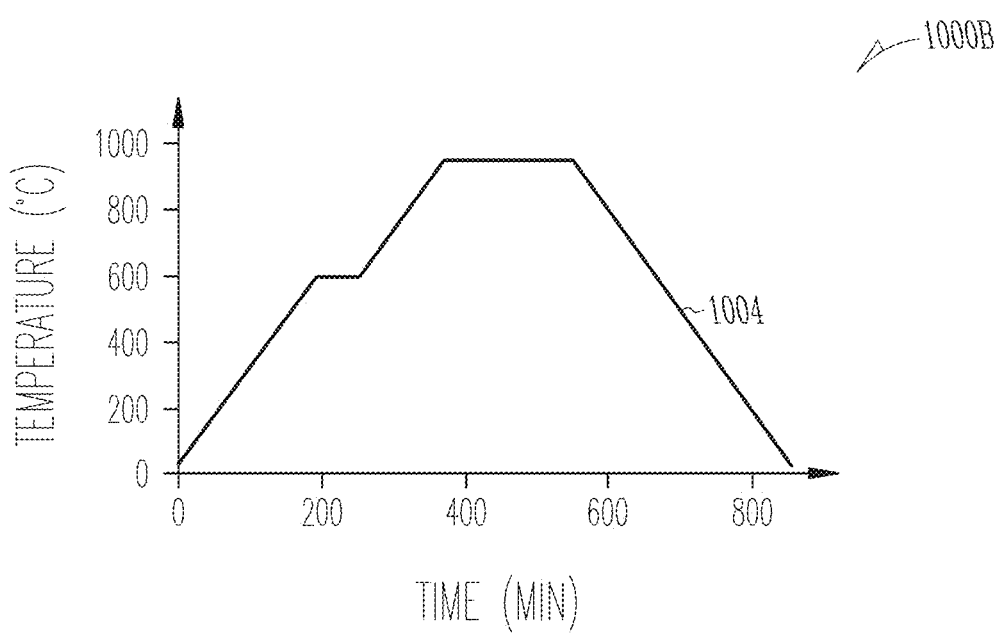
FIG. 10B illustrates a graph associated with an additive manufacturing process, in accordance with at least one example of this disclosure.

FIG. 10A illustrates a graph 1000A associated with an additive manufacturing process, in accordance with at least one example of this disclosure. FIG. 10B illustrates a graph 1000B associated with an additive manufacturing process, in accordance with at least one example of this disclosure. FIGS. 10A and 10B are discussed below concurrently.

In each of the graphs 1000A and 100B, time in minutes is displayed on the X-axis and temperature in degrees Celsius is displayed on the Y-axis. The graph 1000A can include a line 1002 and the graph 1000B can include a line 1004.

After a desired 3D geometry is achieved, post processes of heat-treatment can be conducted to obtain dense metal alloy components, as discussed above. The extruded bronze-oil suspension along with the alumina-water suspension can be first heated in an oven to evaporate the liquid phases (water and silicon oil). The drying temperature schedule is shown in FIG. 10A along the line 1002 where the heat is raised to approximately 70 degrees Celsius and held for approximately 180 minutes before being cooled to room temperature. Other temperatures can be used for drying, such as 45, 50, 55, 60, 65, 75, 80, 85, 90, 95, and 100 degrees Celsius, or the like. Similarly, other times can be used, such as 60, 90, 120, 150, 210, 240, 270 minutes, or the like. Through this step, a dry and compact bronze-powder with a desired 3D geometry can be obtained, which can be surrounded by a nearly dry alumina powder bed, as discussed above. The alumina powder bed still can contain a small amount of silicon oil that diffused from the bronze-oil suspension during drying.

After drying, the bronze-powder compact and the alumina powder bed can be heated together in a furnace, such as an argon furnace, along the temperature line shown in FIG. 10B. Because the temperature used for sintering the bronze powder (i.e., 950° C.) is much lower than the sintering temperature of alumina powder (i.e., 1400° C.), only bronze particles are sintered and the alumina matrix powder remaining loose. Other temperatures can be used for sintering, such as 900, 1000, 1100, 1200, 1300 degrees Celsius, or the like. During the high temperature sintering of the bronze powder, the residual silicon oil in the alumina powder bed can be completely evaporated.

Figure 11A:
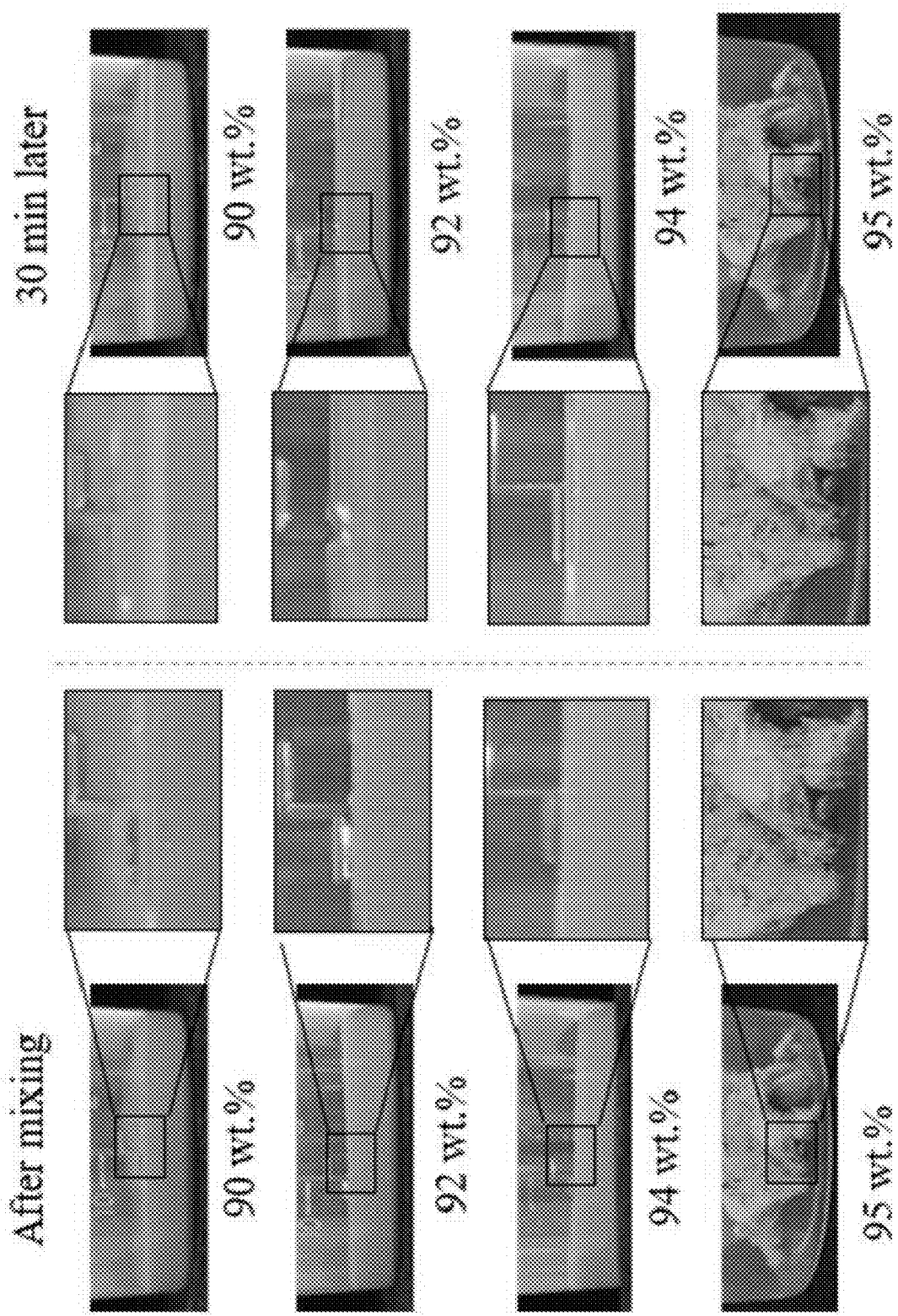
FIG. 11A illustrates results of an additive manufacturing process, in accordance with at least one example of this disclosure.
Figure 11B:
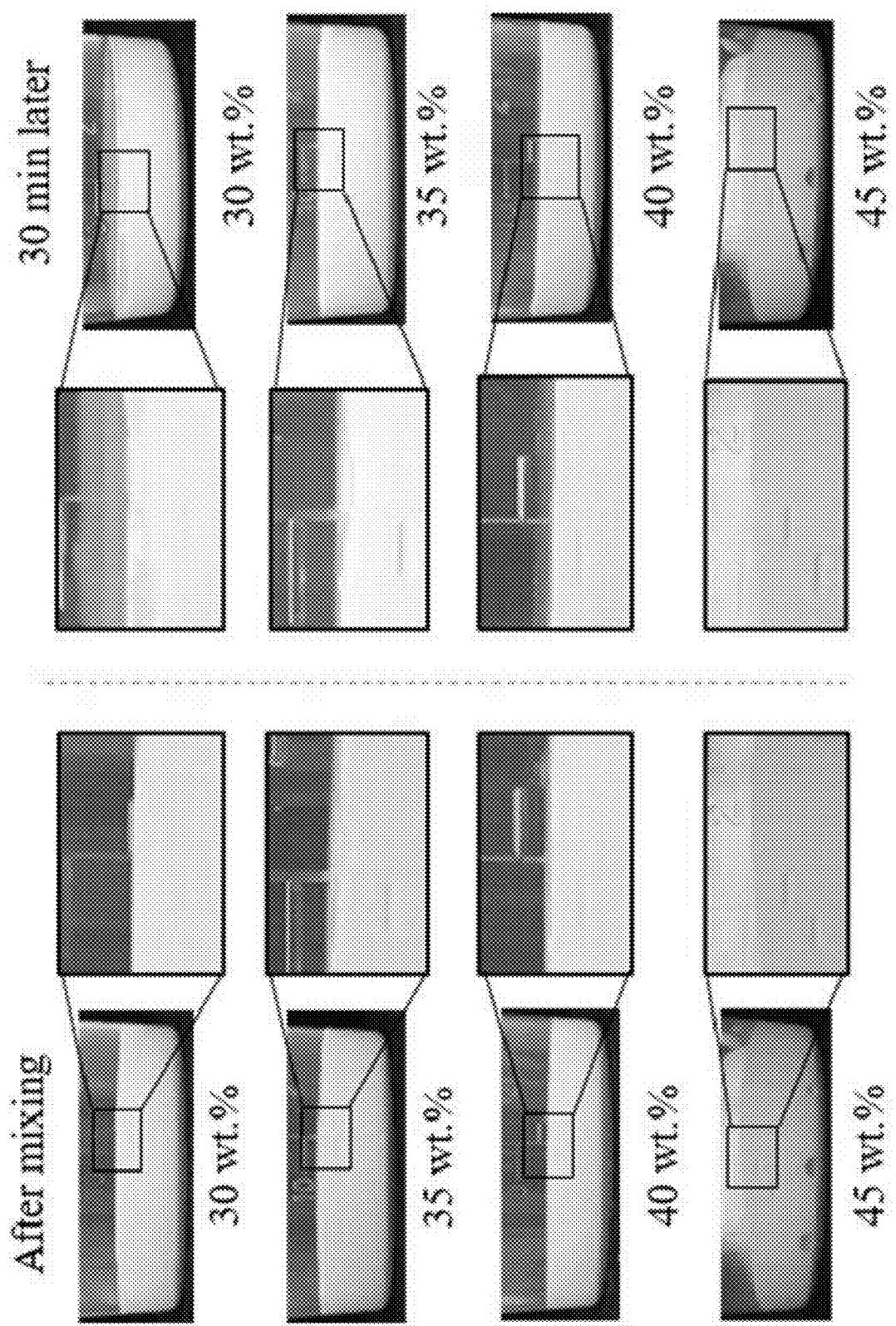
FIG. 11B illustrates results of an additive manufacturing process, in accordance with at least one example of this disclosure.

FIG. 11A illustrates results of an additive manufacturing process, in accordance with at least one example of this disclosure. FIG. 11B illustrates results of an additive manufacturing process, in accordance with at least one example of this disclosure. FIGS. 11A and 11B are discussed below concurrently.

To enable a controllable extrusion through a pressurized dispenser, a bronze-oil suspension must possess a shear elastic modulus G' and a yield stress that are approximately an order of magnitude larger than those of the secondary matrix suspension to ensure the bronze-oil suspension maintains its shape after it exits the nozzle. Meanwhile, an alumina-water suspension should exhibit a shear thinning behavior with a suitable yield stress, such that the bronze-powder suspensions can be supported after extrusion and crevices generated by nozzle movement can be immediately healed. Materials having properties that enable a controllably stable extrusion, gravity settling, and rheology behaviors of bronze-oil and alumina-water suspensions at different solid loadings (about 90 to 95 weight percentage bronze-oil suspensions and about 30 to 45 weight percentage alumina-water suspensions) are shown in FIGS. 11A and 11B.

Sedimentation tests can be performed to determine gravity settling behaviors of suspensions. That is, suspensions at different solid loadings can be thoroughly mixed and then allowed to stand undisturbed for about 30 minutes. As shown in FIGS. 11A and 11B, bronze-oil suspensions with a solid loading less than 92 weight percentage and alumina suspensions with a solid loading less than 30 weight percentage tend to settle rapidly, while a solid loading higher than 95 weight percentage for bronze suspensions and 45 weight percentage for alumina suspensions yields a solid-like behavior. Therefore, 94 weight percentage bronze-oil suspension and a 40 weight percentage alumina-water suspension can help avoid particle sedimentation and can help to ensure optimal stability and printability during the II-DMD process.

Figure 12A:
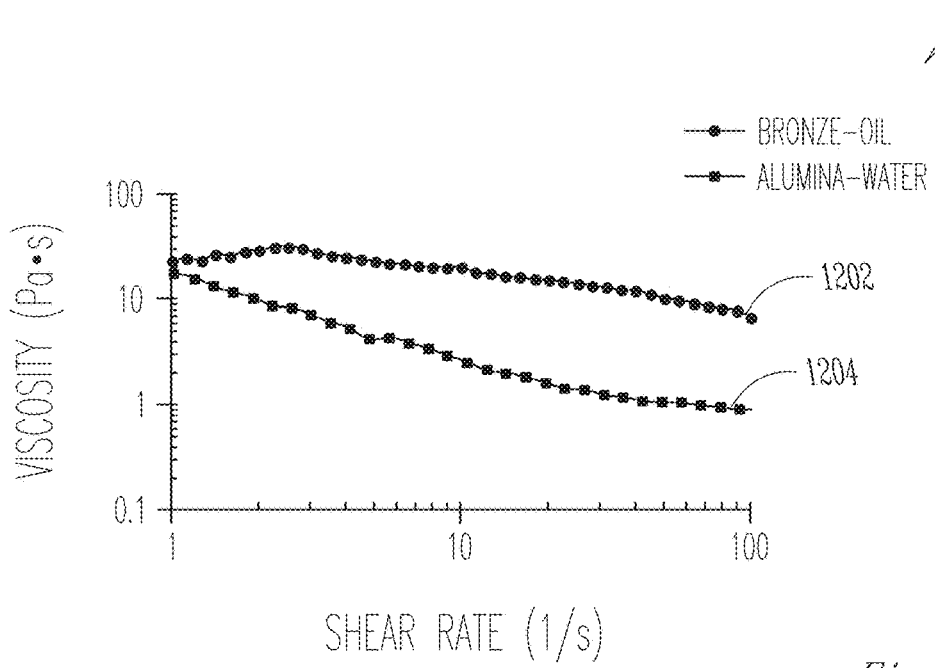
FIG. 12A illustrates a graph associated with an additive manufacturing process, in accordance with at least one example of this disclosure.
Figure 12B:
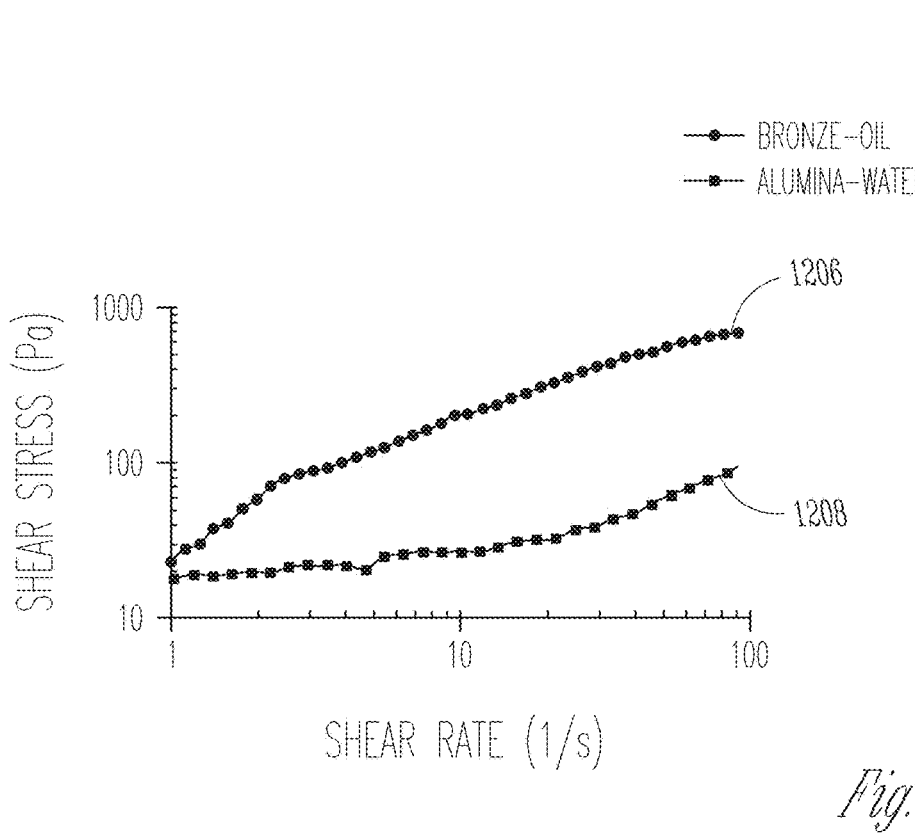
FIG. 12B illustrates a graph associated with an additive manufacturing process, in accordance with at least one example of this disclosure.

FIG. 12A illustrates a graph 1200A associated with an additive manufacturing process, in accordance with at least one example of this disclosure. FIG. 12B illustrates a graph 1200B associated with an additive manufacturing process, in accordance with at least one example of this disclosure. FIGS. 12A and 12B are discussed below concurrently, where Rheology behaviors of a 40 weight percentage alumina-water suspension and a 94 weight percentage bronze-oil suspension are shown on a logarithmic scale. Shear rate is shown on the X-axis for each graph, FIG. 12A shows viscosity in Pascal Seconds on the Y-axis, and FIG. 12B shows Shear Stress in Pascal on the Y-axis. In each graph the shear rate is changed from 1 to 100 l/seconds.

Suspensions with the selected solid loadings, i.e., 94 weight percentage for bronze-oil suspensions, are shown as having a viscosity 1202 with respect to shear rate and a shear stress 1206 with respect to shear rate. And, a 40 weight percentage for alumina-water suspensions are shown as having a viscosity 1204 with respect to shear rate and a shear stress 1208 with respect to shear rate. These properties indicate process-structure relationships of the II-DMD process, including the effects of extrusion pressures p and printing nozzle speed v on extruded filament size y, and the effects of nozzle movement and liquid-phase drying on filament deformation. FIGS. 12A and 12B show that the 40 weight percentage alumina-water suspension and a 94 weight percentage bronze-oil suspension have relative viscosities and shear stresses to produce a desired shear thinning behaviour (the viscosity and yield stress of the bronze-oil is sufficiently high) for the II-DMD process.

Figure 13A:
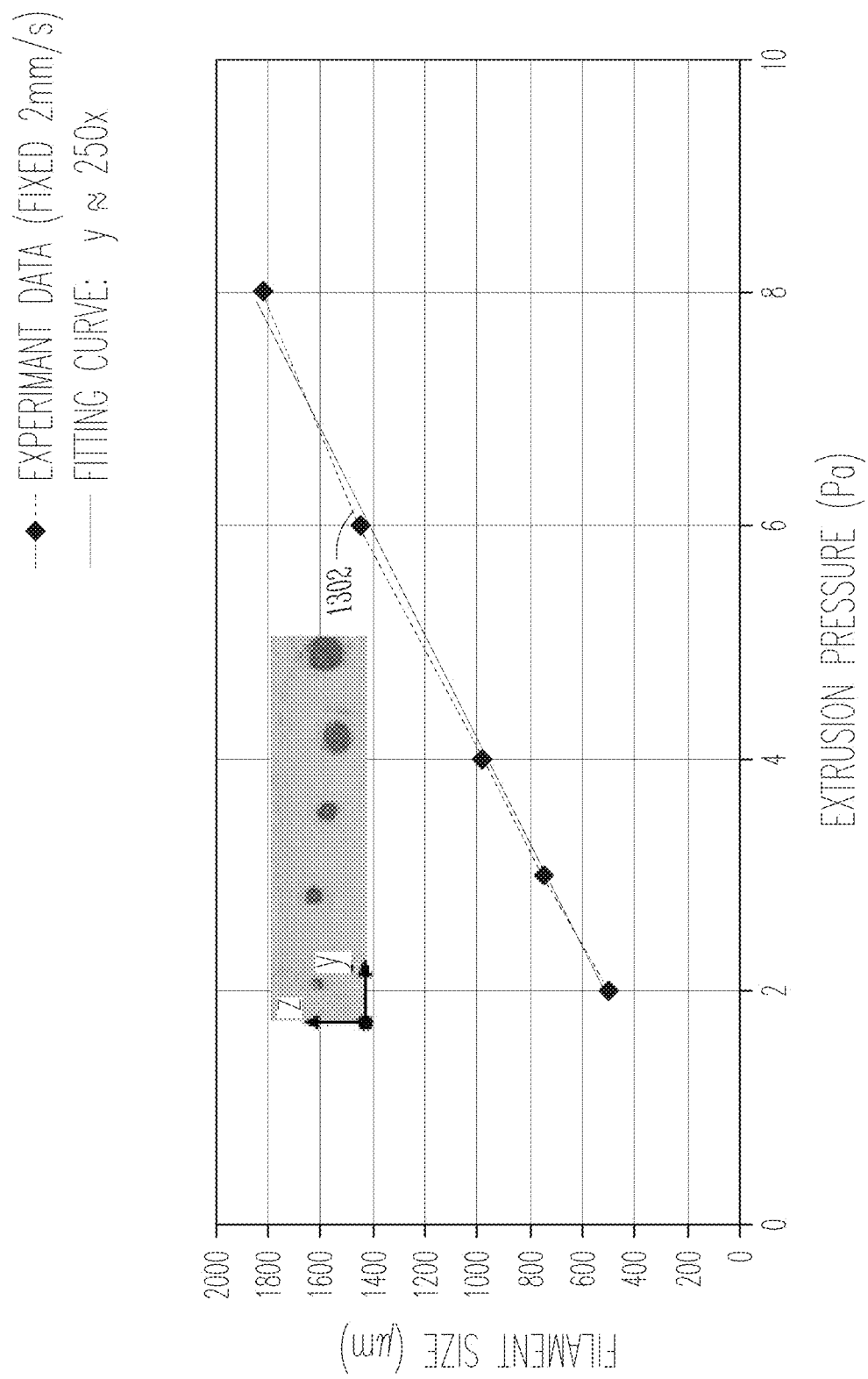
FIG. 13A illustrates a graph associated with an additive manufacturing process, in accordance with at least one example of this disclosure.
Figure 13B:
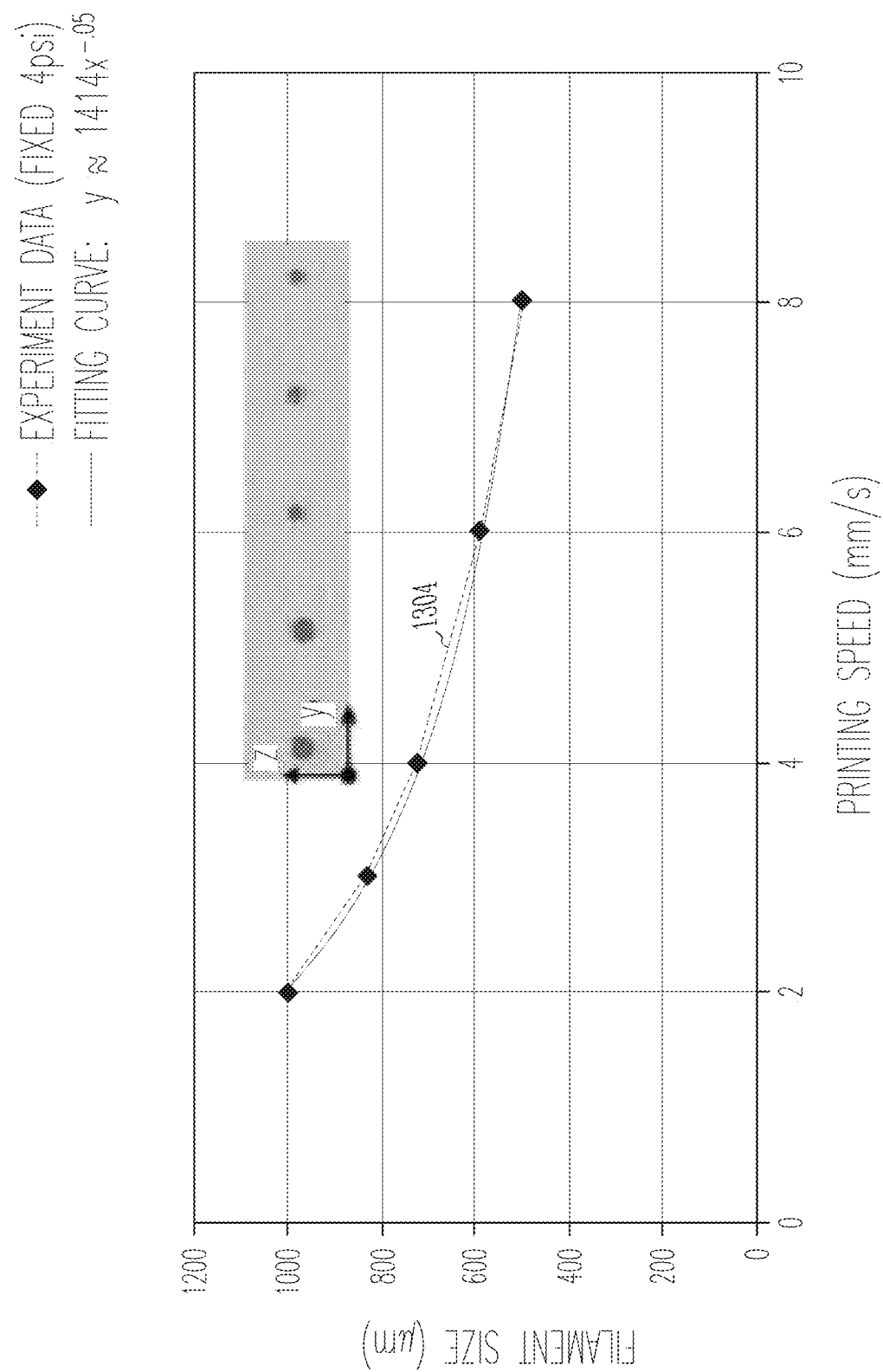
FIG. 13B illustrates a graph associated with an additive manufacturing process, in accordance with at least one example of this disclosure.

FIG. 13A illustrates a graph 1300A associated with an additive manufacturing process, in accordance with at least one example of this disclosure. FIG. 13B illustrates a graph 1300B associated with an additive manufacturing process, in accordance with at least one example of this disclosure. FIGS. 13A and 13B are discussed concurrently below. In FIG. 13A, extrusion pressure in Pascals (Pa) is shown on the X-axis and filament size in micrometers ($\mu$m) is shown on the Y-axis. In FIG. 13B printing speed in millimeters per second is shown on the X-axis and filament size in micrometers ($\mu$m) is shown on the Y-axis. FIG. 13A shows curve 1302 and FIG. 13B shows curve 1304.

The effects of extrusion pressure p and printing nozzle speed v on extruded filament size can be studied by extruding a 94 weight percentage bronze-oil suspension in a 40 weight percentage alumina-water suspension at different extrusion pressures p (between about 2 and 8 Pascals) and printing nozzle speeds v (between about 2 and 8 millimetres per second). A 20 Gauge nozzle (i.e., 0.61 mm inside diameter and 0.91 mm outside diameter) can be used. After drying, the powder bed can be cut in half to display the cross-sections of the extruded filaments. The resulting filament diameters y can be measured.

As shown by the curve 1302 of FIG. 13A, the achieved bronze filament size after drying is substantially proportional to the applied extrusion pressure. The achieved bronze filament size is inversely proportional to the square root of the printing nozzle speed, as shown by the curve 1304 of FIG. 13B. Based on the results, a bronze filament size achieved through the 20 Gauge nozzle can be expressed as the following equation:

$$y \approx 250\sqrt{2} * p * v^{-0.5} \qquad \text{Equation 1}$$

In Equation 1, y is the filament size (unit: $\mu$m), p is the extrusion pressure (unit: psi), and v is the printing nozzle speed (unit: mm/s).

Figure 14B:
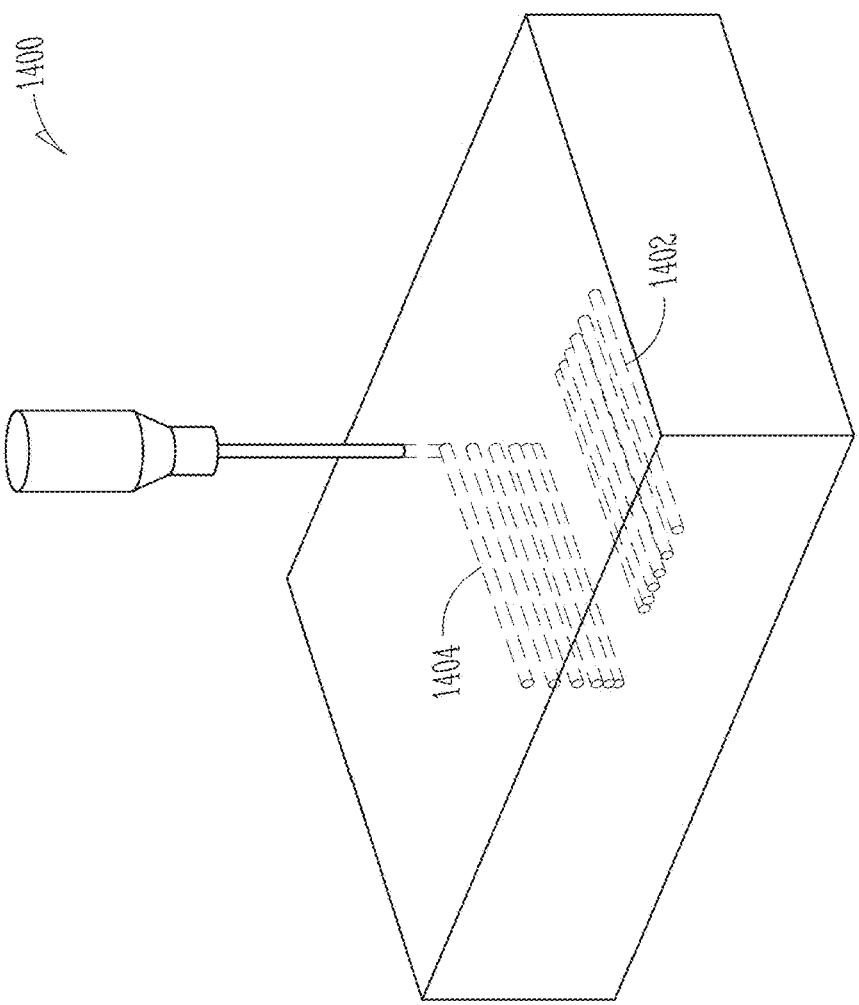
FIG. 14B illustrates an isometric view of an additive manufacturing assembly and process, in accordance with at least one example of this disclosure.
Figure 14A:
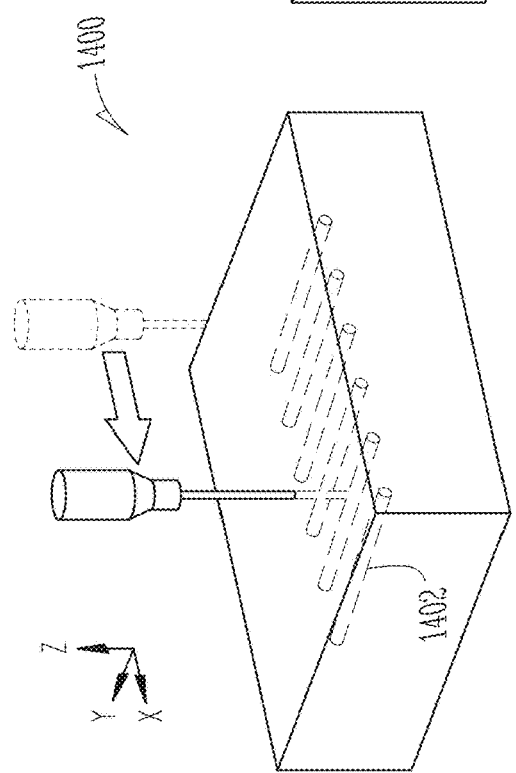
FIG. 14A illustrates an isometric view of an additive manufacturing assembly and process, in accordance with at least one example of this disclosure.
Figure 14E:
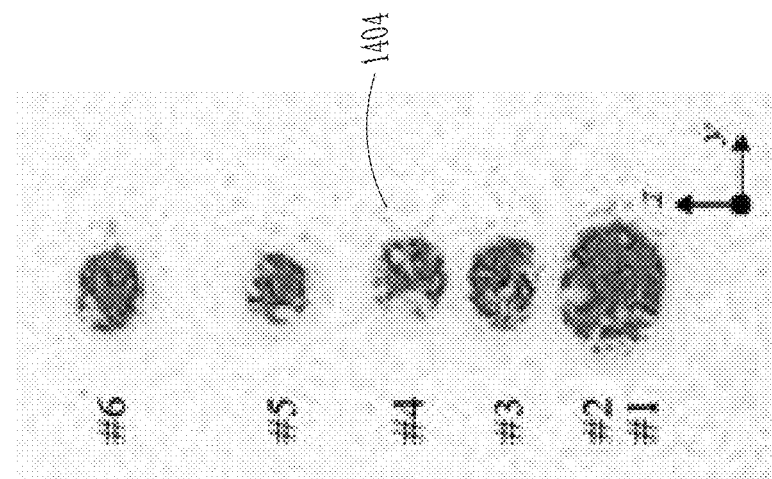
FIG. 14E illustrates cross-sectional views of products produced using an additive manufacturing process, in accordance with at least one example of this disclosure.
Figure 14C:
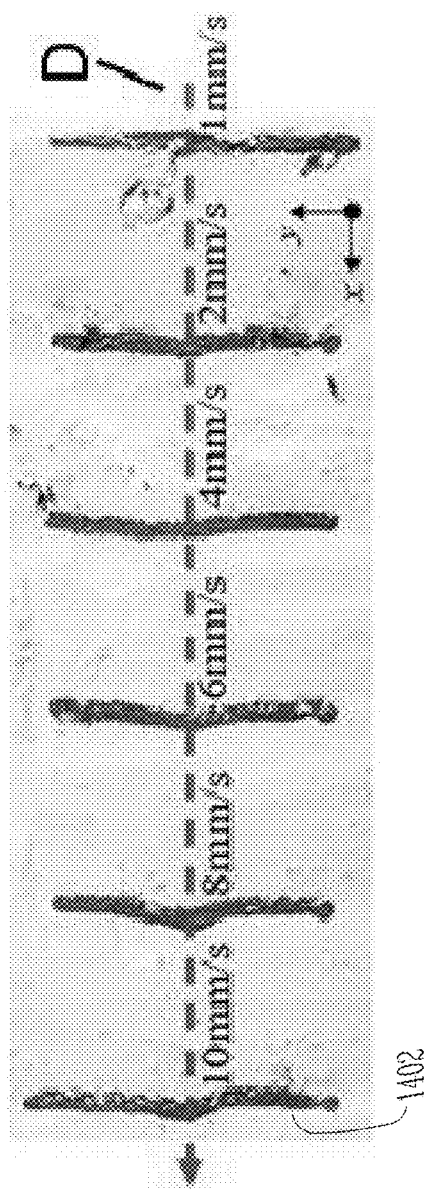
FIG. 14C illustrates top views of products produced using an additive manufacturing process, in accordance with at least one example of this disclosure.
Figure 14D:
FIG. 14D illustrates cross-sectional views of products produced using an additive manufacturing process, in accordance with at least one example of this disclosure.

FIG. 14A illustrates an isometric view of an additive manufacturing assembly 1400 and process, in accordance with at least one example of this disclosure. FIG. 14B illustrates an isometric view of the additive manufacturing assembly 1400 and process, in accordance with at least one example of this disclosure. FIG. 14C illustrates top views of products 1402 produced using an additive manufacturing process, in accordance with at least one example of this disclosure. FIG. 14D illustrates cross-sectional views of products 1402 #1 through #6 produced using an additive manufacturing process, in accordance with at least one example of this disclosure. FIG. 14E illustrates cross-sectional views of products 1404 #1 through #6 produced using an additive manufacturing process, in accordance with at least one example of this disclosure. FIG. 15 illustrates a table data related to an additive manufacturing process, in accordance with at least one example of this disclosure. FIGS. 14A-14E and 15 are discussed concurrently below.

Even though a bronze suspension can be self-stabilized within the alumina matrix suspension after extrusion, extruded bronze suspension filaments can be subjected to deformations caused by nozzle movement during the fabrication process and capillary force of liquid during drying. Effects of nozzle moving speed v and liquid phase drying on extruded bronze filaments should therefore be considered.

The effects of nozzle moving speed v on extruded bronze filaments can be studied as follows: six filaments of a 94 weight percentage bronze-oil suspension can be first extruded (at an extrusion pressure p=4 pounds per square inch) in parallel along the Y-axis in the horizontal plane (the X-Y plane) within a 40 weight percentage alumina-water suspension, as shown in FIG. 14A. Then, the nozzle can be reinserted into the alumina-water suspension at a height of about 1 to 2 millimeters above the extruded filaments and moved along the X-axis with different speeds (about 1 to 10 mm/s). The powder bed can then dried and cut along the x-y plane to show the deformation of filaments of dry bronze particles. The results shown in FIG. 14C suggest that a nozzle speed v greater than 4 millimeters per second can cause a macroscopically obvious distortion of a bronze-suspension filament deposited underneath. A nozzle speed of 2 millimetres per second can therefore be used to minimize an effect of the nozzle on previously-deposited filaments.

The effects of liquid-phase drying on filament deformation can be studied by examining the changes of distances between parallel filaments before and after drying. Filaments can be extruded (at an extrusion pressure p=4 pounds per square inch) in parallel in both X-Y and X-Z planes with different distances increasing from 0.5 millimeters to 1.5 millimeters, as shown in FIG. 14B. Results are shown in FIG. 14D (products 1402 in the horizontal direction) and FIG. 14E (products 1404 in the vertical direction). The values for the final distances are shown in FIG. 15. The average filament diameter was measured as 0.75 millimeters.

According to the table of FIG. 15, the final distances between adjacent filaments 1402 #1 through #6 along the horizontal direction can be greater than the designed distances. This slight increase can be due to the influence of stress fields introduced by the nozzle movement during filament extrusion. On the contrary, the final distances between the adjacent filaments 1404 #1 through #6 along the vertical direction can be smaller than the designed settings. This can be explained by the anisotropic drying shrinkage of the powder bed along the vertical direction. In addition, the greater decrease in the distance between the #1 and the #2 filaments along the vertical direction may be explained by the coalescence of the two filaments under surface tension. The increase in the distance between the #2 and the #3 filaments along the vertical direction can be due to measurement errors because the #2 filament merged with the #1 filament.

Figure 16A:
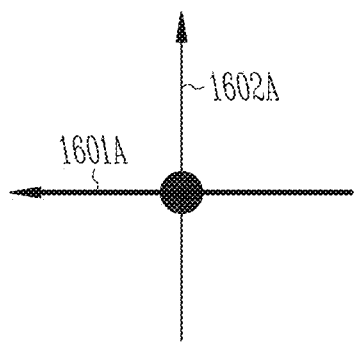
FIG. 16A illustrates a schematic view of a result of an additive manufacturing process, in accordance with at least one example of this disclosure.
Figure 16B:
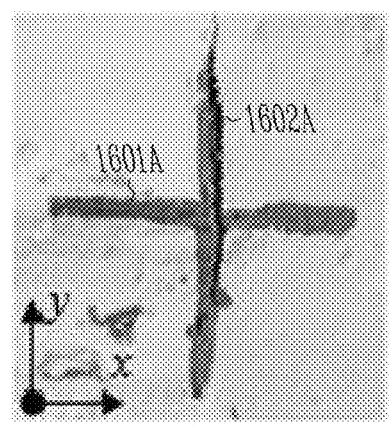
FIG. 16B illustrates a top view of a result of an additive manufacturing process, in accordance with at least one example of this disclosure.
Figure 16C:
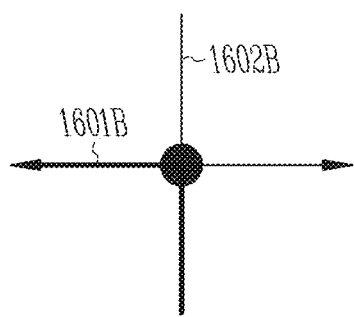
FIG. 16C illustrates a schematic view of a result of an additive manufacturing process, in accordance with at least one example of this disclosure.
Figure 16D:
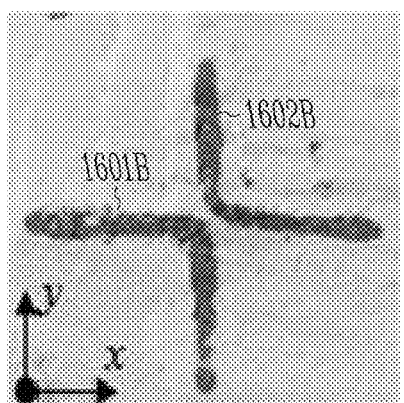
FIG. 16D illustrates a top view of a result of an additive manufacturing process, in accordance with at least one example of this disclosure.

FIG. 16A illustrates a schematic view of a result of an additive manufacturing process, in accordance with at least one example of this disclosure. FIG. 16B illustrates a top view of a result of an additive manufacturing process, in accordance with at least one example of this disclosure. FIG. 16C illustrates a schematic view of a result of an additive manufacturing process, in accordance with at least one example of this disclosure. FIG. 16D illustrates a top view of a result of an additive manufacturing process, in accordance with at least one example of this disclosure. FIGS. 16A-16D are discussed below concurrently.

Path planning strategies at intersection points of two filaments can been studied. As shown in FIGS. 16A-16D, a 94 weight percentage bronze-oil suspension with a cross shape can be extruded in the horizontal plane in a 40 weight percentage alumina-water suspension along two different paths, i.e., path A and B. In path A, a filament 1602A can be directly extruded across a filament 1601A. In path B, each of the filaments 1601B and 1602B can be extruded with a 90-degree turn and met in the intersection. The results after drying are shown in FIGS. 16B and 16D, which indicate that path A can help avoid disconnection of the filaments.

Figure 17B:
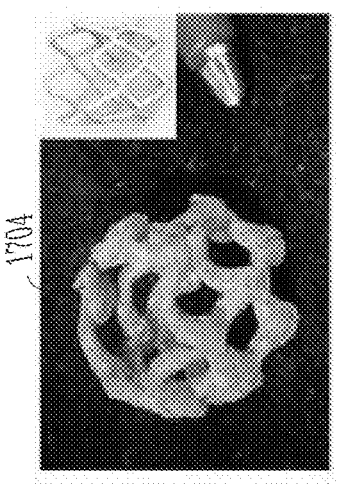
FIG. 17B illustrates a top view of a result of an additive manufacturing process, in accordance with at least one example of this disclosure.
Figure 17D:
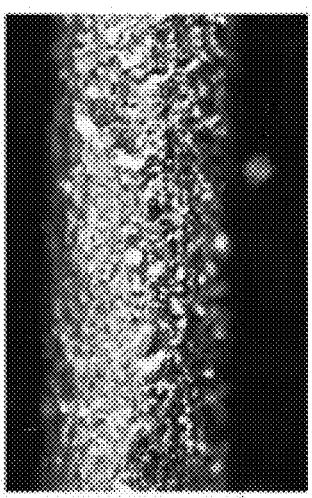
FIG. 17D illustrates a top view of a result of an additive manufacturing process, in accordance with at least one example of this disclosure.
Figure 17A:
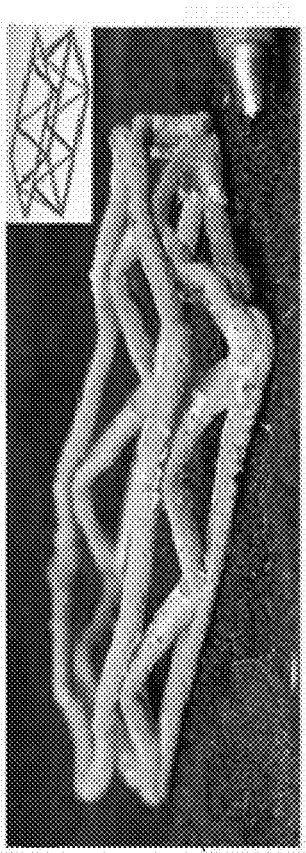
FIG. 17A illustrates a schematic view of a result of an additive manufacturing process, in accordance with at least one example of this disclosure.
Figure 17C:
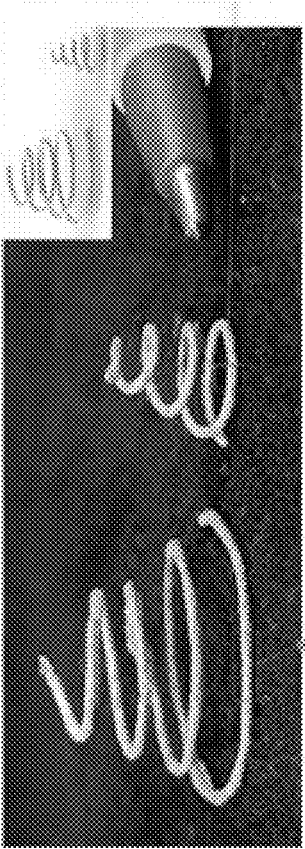
FIG. 17C illustrates a schematic view of a result of an additive manufacturing process, in accordance with at least one example of this disclosure.
Figure 17E:
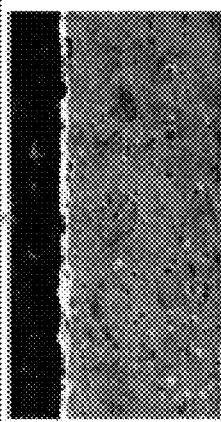
FIG. 17E illustrates a scanning electron microscope imaging result of additive manufacturing product, in accordance with at least one example of this disclosure.
Figure 17F:
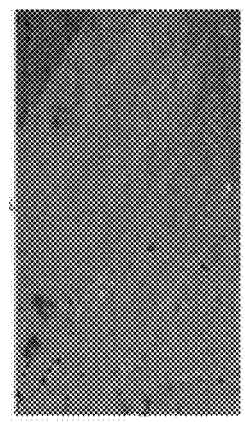
FIG. 17F illustrates a scanning electron microscope imaging result of additive manufacturing product, in accordance with at least one example of this disclosure.
Figure 17G:
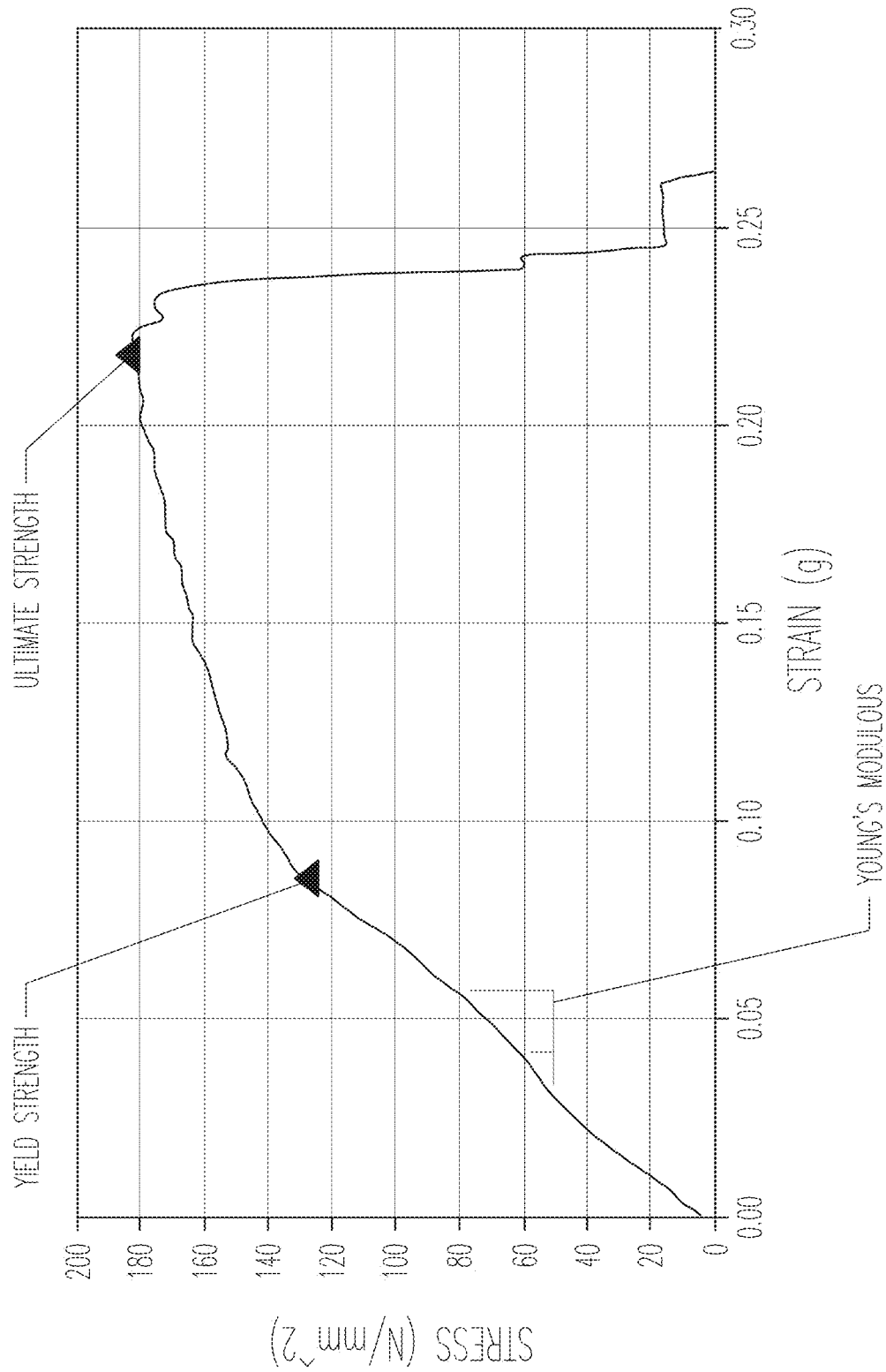
FIG. 17G illustrates a graph associated with an additive manufacturing process, in accordance with at least one example of this disclosure.

FIG. 17A illustrates a schematic view of a result of an additive manufacturing process, in accordance with at least one example of this disclosure. FIG. 17B illustrates a top view of a result of an additive manufacturing process, in accordance with at least one example of this disclosure. FIG. 17C illustrates a schematic view of a result of an additive manufacturing process, in accordance with at least one example of this disclosure. FIG. 17D illustrates a top view of a result of an additive manufacturing process, in accordance with at least one example of this disclosure. FIG. 17G illustrates a graph associated with an additive manufacturing process, in accordance with at least one example of this disclosure. FIG. 18 illustrates a table data related to an additive manufacturing process, in accordance with at least one example of this disclosure. FIGS. 17A-17E and FIG. 18 are discussed below concurrently.

Example structures produced using the methods and devices discussed above are shown in FIGS. 17A-17E. For example, FIG. 17A shows a bronze lattice structure 1702, which can be used as a structural frame of, for example, a micro robot. FIG. 17B shows a stent structure 1704, which can be applied to prop up a pathologically changed blood vessel in a human body if shape memory alloy powder is used. There are therefore potential applications of the processes discussed above in fabricating metal/alloy lattice and truss structures.

Other structures (as discussed above with respect to FIGS. 3A-3D) can be produced using the II-DMD processes, such as two cone springs with different sizes, shown in FIG. 17C. An optical microscope image of the external surface of the springs is shown in FIG. 17D. The rough surface finish is mainly caused by a large bronze particle size (with a diameter of 44 micro meters (μm)) used in the process. Scanning electron microscope (SEM) images of the spring specimens are shown in FIGS. 17E and 17F, where it can be seen that small pores with diameters around 10 to 40 μm can exist in the cross section.

Mechanical properties of fabricated metal structures can be determined using a tensile tester. Three bronze filament specimens (with a diameter of 1 mm and a length of 40 mm) can be used. A slow strain rate of 2.54 millimeters per minute can be applied due to a small diameter of the specimens. The testing results are in FIG. 17G and FIG. 18, which show that the bronze material fabricated using the processes discussed herein can have a maximum yield strength of 126 mega Pascals (MPa) and a maximum ultimate strength of 188 MPa. In addition, the density of fabricated specimens can be measured by the Archimedes method (ASTM C373-88). The result shows an average density of 95.5% of the density of raw Tin Bronze.

Notes and Examples

The following, non-limiting examples, detail certain aspects of the present subject matter to solve the challenges and provide the benefits discussed herein, among others.

Example 1 is a method of three-dimensional printing of target material comprising: filling a receptacle with a matrix suspension comprising a powder matrix suspended in a first liquid; extruding a second suspension into the matrix suspension, the second suspension comprising a target powder suspended in a second liquid; evaporating at least one of the first and second liquids by heating to a temperature high enough to facilitate evaporation of the first and second liquids but not high enough to sinter or melt the target powder or powder matrix; and heating the matrix suspension and the second suspension to a temperature high enough to dry the matrix suspension and the second suspension and high enough to sinter the target powder, but not high enough to sinter or melt the matrix powder, to form a sintered final product.

In Example 2, the subject matter of Example 1 optionally includes removing the sintered final product from the powder matrix.

In Example 3, the subject matter of any one or more of Examples 1-2 optionally include wherein the melting temperature of the target powder is higher than the melting temperature of the powder matrix.

In Example 4, the subject matter of any one or more of Examples 1-3 optionally include wherein the second suspension is immiscible with the matrix suspension.

In Example 5, the subject matter of any one or more of Examples 1-4 optionally include wherein the matrix suspension maintains the second suspension substantially in place during extruding of the target powder.

In Example 6, the subject matter of any one or more of Examples 1-5 optionally include wherein extruding the second suspension into the matrix suspension is performed by injecting the second suspension into the matrix suspension.

In Example 7, the subject matter of Example 6 optionally includes wherein extruding the second suspension into the matrix suspension is performed using a movable nozzle or a movable needle.

Example 8 is a method of creating a metal object using additive manufacturing, the method comprising: filling a receptacle with a matrix suspension including a powder matrix suspended in a first liquid; extruding a metal suspension into the matrix suspension, the metal suspension including a metal powder suspended in a second liquid; evaporating the first and second liquids by heating the metal suspension and the matrix suspension to a first temperature below a sinter temperature and a melt temperature of the powder metal and below a sinter temperature and a melt temperature of the powder matrix; and heating the powder metal and powder matrix to a second temperature at or above the sinter temperature of the powder metal to sinter the powder metal, the second temperature below the sinter temperature and the melt temperature of the powder matrix, to form a sintered metal product.

In Example 9, the subject matter of Example 8 optionally includes wherein the powder matrix is a ceramic and the first liquid is water.

In Example 10, the subject matter of any one or more of Examples 8-9 optionally include wherein powder metal is bronze and the second liquid is silicon oil.

In Example 11, the subject matter of any one or more of Examples 8-10 optionally include wherein the first temperature is about seventy degrees Celsius for about one hour.

In Example 12, the subject matter of any one or more of Examples 8-11 optionally include wherein the second temperature is about 950 degrees Celsius for about three hours.

In Example 13, the subject matter of any one or more of Examples 1-12 optionally include wherein the powder metal and the powder matrix is heated by inert gas.

In Example 14, the subject matter of any one or more of Examples 1-13 optionally include wherein the sintered metal product includes at least one isotropic property.

In Example 15, the subject matter of any one or more of Examples 8-14 optionally include wherein the metal suspension is immiscible with the matrix suspension.

Example 16 is an article of manufacture comprising: a colloidal suspension of a matrix material suspended in a first liquid; a colloidal suspension of a build material suspended in a second liquid; wherein the first liquid and the second liquid are immiscible; and a receptacle holding the matrix material in a first liquid and the build material in a second liquid.

In Example 17, the subject matter of Example 16 optionally includes wherein the matrix material is ceramic, the first liquid is water, the build material is metal, and the second liquid is silicon oil.

In Example 18, the subject matter of any one or more of Examples 16-17 optionally include wherein the first liquid and the second liquid can be evaporated by heating without evaporating the matrix material and the build material.

In Example 19, the subject matter of any one or more of Examples 16-18 optionally include wherein a difference between the melting temperature of the matrix material and the melting temperature of the build material is large enough to permit sintering of the build material without sintering or melting the matrix material.

In Example 20, the subject matter of any one or more of Examples 16-19 optionally include wherein the matrix material in the first liquid holds the build material in the second liquid substantially in place.

In Example 21, the apparatuses or method of any one or any combination of Examples 1-20 can optionally be configured such that all elements or options recited are available to use or select from.

In Example 21, the subject matter of any one or more of Examples 16-20 optionally include wherein the colloidal suspension of the matrix material is a 40 weight percentage alumina-water suspension.

In Example 22, the subject matter of any one or more of Examples 16-21 optionally include wherein the colloidal suspension of the build material is a 94 weight percentage bronze-oil suspension.

In Example 23, the subject matter of any one or more of Examples 16-22 optionally include wherein the article is a coil or a lattice structure.

In Example 24, the subject matter of any one or more of Examples 1-6 optionally include wherein the matrix suspension is a 40 weight percentage alumina-water suspension.

In Example 25, the subject matter of any one or more of Examples 1-6 and 24 optionally includes wherein the second suspension is a 94 weight percentage bronze-oil suspension.

In Example 26, the subject matter of any one or more of Examples 1-6 optionally wherein the matrix suspension is an alumina-water suspension having a weight percentage between 30 and 45 percent alumina.

In Example 27, the subject matter of any one or more of Examples 1-6 optionally include wherein the second suspension is a bronze-oil suspension having a weight percentage between 90 and 95 percent of bronze.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method of three-dimensional printing of target material comprising:
    filling a receptacle with a matrix suspension comprising a ceramic powder matrix suspended in water;
    extruding a second suspension into the matrix suspension, the second suspension comprising a target powder suspended in a second liquid, wherein the second liquid is oil immiscible with water;
    evaporating at least one of the water and the second liquid by heating to a temperature high enough to facilitate evaporation of the water and the second liquid but not high enough to sinter or melt the target powder or ceramic powder matrix; and
    heating the target powder and the ceramic powder matrix to a temperature high enough to dry the target powder and the ceramic powder matrix and high enough to sinter the target powder, but not high enough to sinter or melt the ceramic powder matrix, to form a sintered final product.

2. The method of claim 1, further comprising:
    removing the sintered final product from the ceramic powder matrix.

3. The method of claim 1, wherein the melting temperature of the target powder is lower than the melting temperature of the ceramic powder matrix.

4. The method of claim 1, wherein the matrix suspension maintains the second suspension substantially in place during extruding of the target powder.

5. The method of claim 1, wherein extruding the second suspension into the matrix suspension is performed by injecting the second suspension into the matrix suspension.

6. The method of claim 5, wherein extruding the second suspension into the matrix suspension is performed using a movable nozzle or a movable needle.

7. The method of claim 1, wherein powder metal is bronze and the second liquid is silicon oil.

8. The method of claim 1, wherein the first temperature is about seventy degrees Celsius for about one hour.

9. The method of claim 1, wherein the second temperature is about 950 degrees Celsius for about three hours.

10. The method of claim 1, herein the powder metal and the powder matrix are heated by inert gas.

11. The method of claim 1, wherein the sintered metal product includes at least one isotropic property.

* * * * *